United States Patent [19]
LaRue et al.

[11] Patent Number: 5,953,406
[45] Date of Patent: Sep. 14, 1999

[54] GENERALIZED CUSTOMER PROFILE EDITOR FOR CALL CENTER SERVICES

[75] Inventors: David L. LaRue, Cedar Rapids; James Brian Ivey, Marion; Timothy M. Leonard, Coralville, all of Iowa

[73] Assignee: MCI Communications Corporation, Washington, D.C.

[21] Appl. No.: 08/859,421

[22] Filed: May 20, 1997

[51] Int. Cl.⁶ .............................. H04M 3/00; H04M 3/42
[52] U.S. Cl. .................. 379/265; 379/10; 379/93.24; 379/201
[58] Field of Search .................................... 379/201, 265, 379/266, 309, 93.24, 207, 9, 10, 15, 16, 17, 242

[56] References Cited

U.S. PATENT DOCUMENTS

| | | | |
|---|---|---|---|
| 5,097,528 | 3/1992 | Gursahaney et al. | 379/201 |
| 5,323,452 | 6/1994 | Dickman et al. | 379/201 |
| 5,406,557 | 4/1995 | Baudoin | 379/93.24 |
| 5,455,853 | 10/1995 | Cebulka et al. | 379/201 |
| 5,530,740 | 6/1996 | Irribarren et al. | 379/93.24 |
| 5,541,986 | 7/1996 | Hou | 379/207 |
| 5,790,649 | 8/1998 | Hiroshige | 379/93.24 |
| 5,793,861 | 8/1998 | Haigh | 379/265 |
| 5,822,400 | 10/1998 | Smith | 379/265 |
| 5,822,410 | 10/1998 | McCausland et al. | 379/265 |

*Primary Examiner*—Krista Zele
*Assistant Examiner*—Scott Wolinsky

[57] ABSTRACT

A profile editor is provided for creating and editing customer profiles. The customer profiles hold information regarding customers of a call center. Each customer profile encapsulates information regarding call flow of a call serviced by the call center on behalf of the customer. For example, a customer profile may hold product information, pricing information, shipping information, call flow information, scripts, and other information for a customer that may be used by an operator to service a call on behalf of the customer. The profile editor may also include a test operator console program to test how an operator console program that is used to assist an operator in servicing calls on behalf of a customer in the call center will use a customer profile.

18 Claims, 21 Drawing Sheets

Figure 10C:
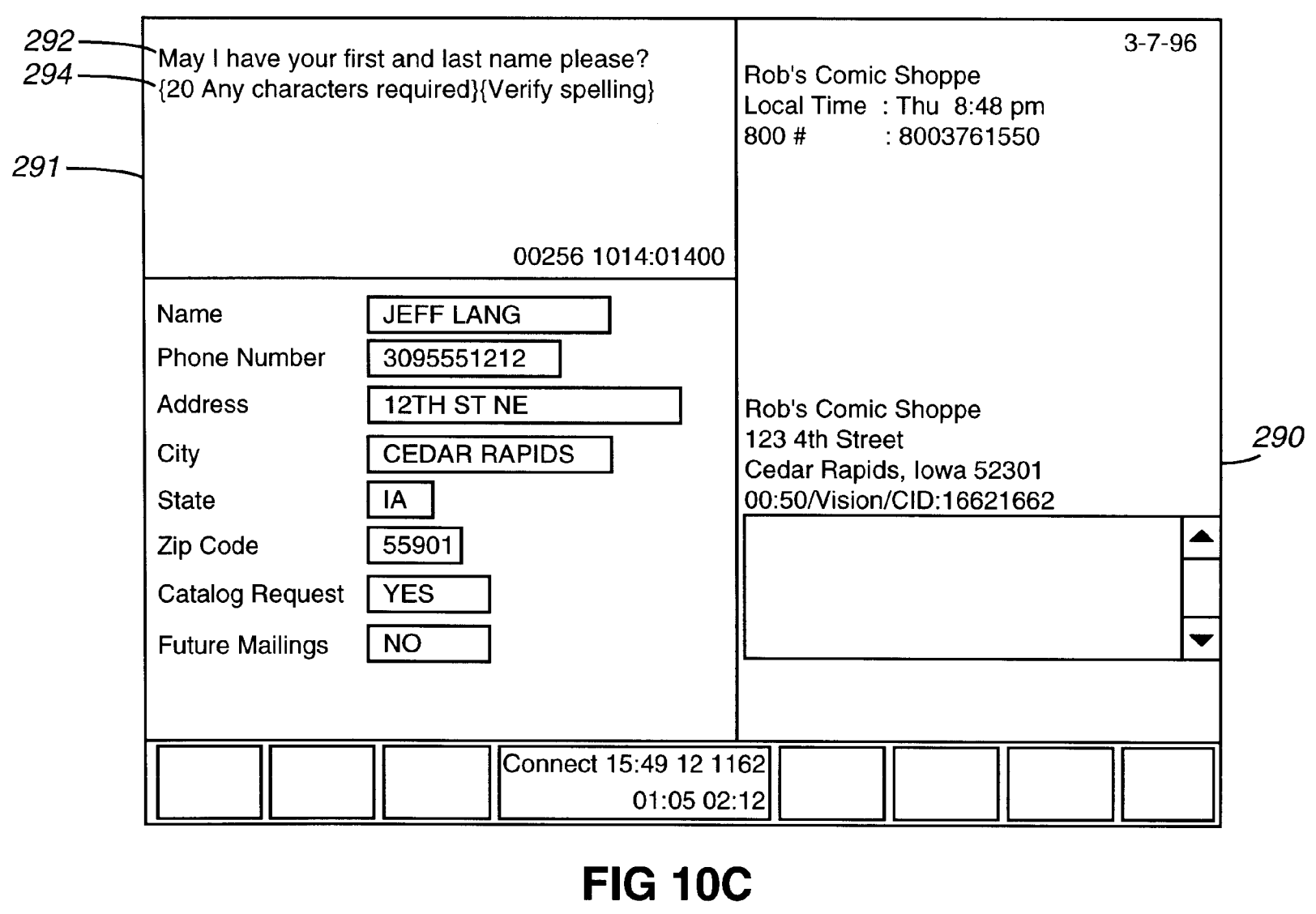

Rob's Comic Shoppe
Local Time : Thu 8:48 pm
800 # : 8003761550

Rob's Comic Shoppe
123 4th Street
Cedar Rapids, Iowa 52301
00:50/Vision/CID:16621662

00256 1014:01400

May I have your first and last name please? — 292
{20 Any characters required}{Verify spelling} — 294

291

| | |
|---|---|
| Name | JEFF LANG |
| Phone Number | 3095551212 |
| Address | 12TH ST NE |
| City | CEDAR RAPIDS |
| State | IA |
| Zip Code | 55901 |
| Catalog Request | YES |
| Future Mailings | NO |

Connect 15:49 12 1162
01:05 02:12

GENERALIZED CUSTOMER PROFILE EDITOR FOR CALL CENTER SERVICES

TECHNICAL FIELD

The present invention relates generally to telecommunications systems and, more particularly, to a generalized customer profile editor for call center services.

BACKGROUND OF THE INVENTION

A typical call center includes a number of agents who handle inbound telephone calls and place outbound telephone calls on behalf of business clients, known as customers. Each agent may receive or place calls for multiple customers. Each agent has an associated agent station that includes a personal computer or workstation, a phone pad, and a telephone headset.

The customers that are serviced by the call center may be in many different types of businesses. For example, a first customer may run a mail order catalog while a second customer may seek survey information based upon a current advertising campaign. The service provided by the call center must be customized to each customer. As a result, in conventional systems, separate application programs have been developed to service respective customers by operators at the operator consoles. Information regarding the customer has generally been obtained manually and hard coded into the application programs. This approach is both costly and time consuming.

SUMMARY OF THE INVENTION

The limitations of the prior art are overcome by the present invention, which provides an automated and generalized package for obtaining customized information about customers that is needed for servicing calls on behalf of the customers. In one embodiment, a profile editor is provided that facilitates the creation of customer profiles. Each customer profile encapsulates all of the information necessary for an operator to service calls in a call center on behalf of a customer. This information may include, for example, scripts, call flow information, product information, pricing information, and shipping information.

In accordance with a first aspect of the present invention, a method for gathering data for a call center is practiced on a computer system. A profile editor is provided in the computer system for editing a customer profile for a customer of the call center. The profile editor is then used to create the customer profile for the customer. This customer profile specifies a call flow for calls to be handled by the call center on behalf of the customer. The customer profile is then forwarded to the call center for use therein.

In accordance with another aspect of the present invention, a profile editor is provided in the computer system for creating a customer profile for a customer of a call center. A call center has operators stationed at workstations for servicing calls. A test operator console program is provided in the computer system to simulate operation of an operator console program run at the workstation of one of the operators. This operator console program assists the operator in servicing calls. The profile editor is used to obtain a customer profile for the customer. The customer profile specifies a call flow for calls to the customer that are serviced by operators of the call center. The test operator console program is then run to simulate call flow for calls to the customer based on the customer profile.

BRIEF DESCRIPTION OF THE DRAWINGS

A preferred embodiment of the present invention will be described below relative to the following figures.

FIG. 10C illustrates an example screen display of an operator console that uses a customer profile.

DETAILED DESCRIPTION OF THE INVENTION

The preferred embodiment of the present invention provides a profile editor for obtaining and editing customer profile information. A separate customer profile is maintained for each customer to hold customer information for the customer. Each customer profile contains all the requisite information that is needed by an operator to service calls on behalf of the customer. The profile editor enables a marketing representative to go out into the field and create a customer profile in the field. The profile editor includes a user interface that enables the marketing representative to solicit the requisite information that is needed to provide a complete customer profile.

The profile editor is generalized so as to be able to generate customer profiles for many different types of customers. The user interface of the profile editor allows the marketing representative to develop a customer profile that suits the needs of the customer. The customer profile may specify what products are to be sold on behalf of the customer, sales information about products, and even telephone operator scripts that operators may use in servicing calls on behalf of the customer. The data that is gathered by the profile editor is stored in a platform-independent and efficient fashion.

The profile editor may include a test version of an agent console application. This test version allows the marketing representative to test a customer profile at the customer site so that the customer can see how calls will be handled by operators based on the current customer profile. If a customer is not happy with a certain aspect of the call flow resulting from a proposed customer profile, modifications may be made. When a customer is satisfied with the profile, the profile may be forwarded via email or other transmission medium to a delivery service that distributes a customer profile to the appropriate location within the call center.

The data gathered in the customer profile is validated at multiple levels. The profile editor insures that the input that is collected by the profile editor is in the proper format. A second level of validation of the customer profiles is performed prior to storing the customer profiles at the call center.

The profile editor has the benefit of providing an interactive mechanism for gathering and editing customer information for customers of a call center. Moreover, the validation performed by the editor insures that the gathered information is in the correct format and that the marketing representative gathers the requisite information needed to properly service the customer. As will be described in more detail below, the profile editor may be stored on a portable computer and thus may be readily carried by marketing representatives into the field. The profile editor provides a quick and efficient mechanism for gathering customer profile information.

Figure 1:
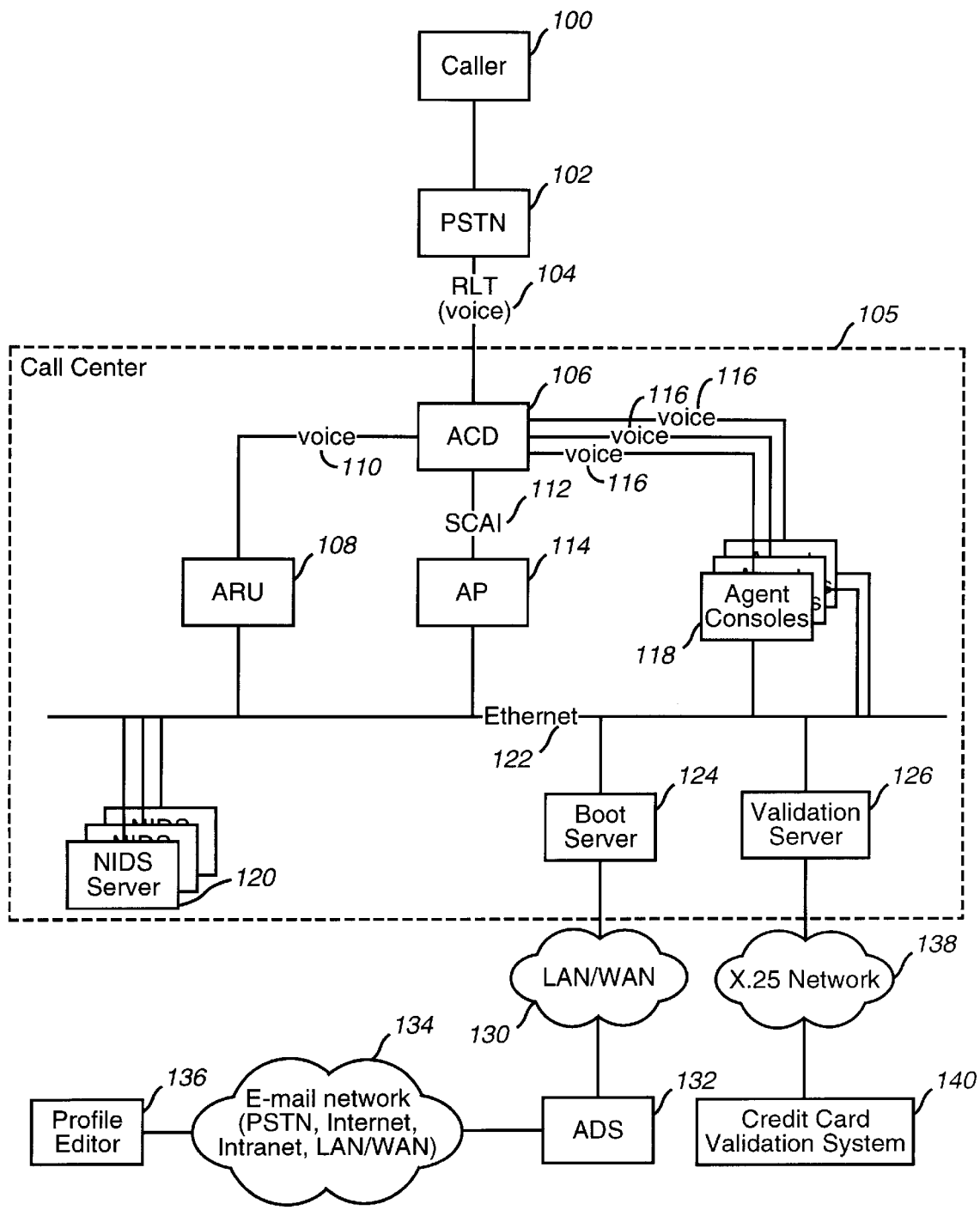
FIG. 1 is a diagram that illustrates a telecommunications environment that is suitable for practicing the preferred embodiment of the present invention.

FIG. 1 depicts an environment that is suitable for practicing the preferred embodiment of the present invention. This environment includes a call center 105 that may be accessed by caller 100 via a public switched telephone network (PSTN) 102. The PSTN 102 may be connected to the call center 105 via a voice release trunk (RLT) 104. The call center 105 includes an automatic call distributor (ACD) 106 for distributing calls within the call center. The ACD is connected via a voice trunk 110 to an automated response unit (ARU) 108. The ARU 108 provides voice response and menu routing functions to a caller.

The call center 105 may also include an application processor (AP) 114 that is associated with the ACD 106. The AP 114 may be a dedicated computer system that provides intelligent application processing for assisting the ACD 106. In particular, certain functionality that may be performed by the ACD 106 is off loaded to the AP 114 to enable the ACD to focus on performing switching and queuing functions. The AP 114 is linked to the ACD 106 via an ISDN implementation of a switch/computer application interface (SCAI) link 112.

The call center 105 may include multiple agent consoles 118. These consoles are connected to the ACD 106 via voice trunks 116. Each agent console may include a workstation, a telephone pad, and a headset. Human operators at the agent consoles perform scripts, prompting, and transferring of calls that are needed for call processing on behalf of customers.

The call center 105 may also include multiple network information distributed services (NIDS) 120. Each of the NIDS 120 may be implemented as a separate computer system. The NIDS 120 may be redundant, and generally serve the role of storing database information. The NIDS 120 may all be connected to an Ethernet local area network (LAN) 42 that also interconnects the ARU 108, the AP 114, the agent consoles 118, a boot server 124, and a validation server 126.

The boot server 124 stores the customer profiles in the call center 105 and is responsible for distributing the customer profiles to other entities within the call center 105. The validation server 126 is responsible for performing credit card validations for caller orders. The validation server 126 may be connected via a network, such as an X.25 network 138 to a credit card validation system 140.

The boot server 124 is connected via a LAN or wide area network (WAN) 130 to the answernet delivery service (ADS) 132. The ADS 132 may be implemented by a midrange computer system that is responsible for delivering customer profiles to the appropriate boot servers via the LAN/WAN 130. The ADS 132 may be connected to multiple call centers and may distribute the customer profiles to the appropriate call centers. Customer profiles are received from the profile editor 136. The customer profiles may be emailed over an email network (such as a PSTN, the internet, an intranet, or a LAN/WAN) 134 to the ADS 132. The profile editor 136 may be run on a personal computer and, may be run on a portable computer that may be carried by a marketing representative, as has been discussed above.

Figure 2:
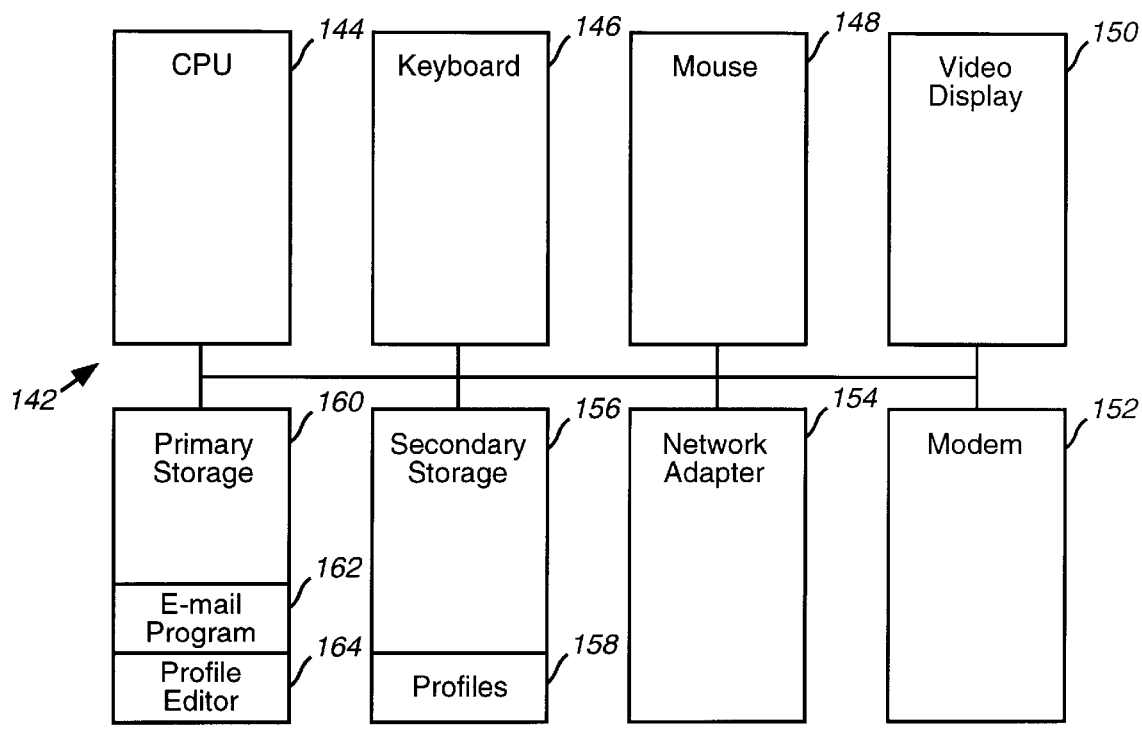
FIG. 2 is a block diagram of the computer system that is suitable for practicing the preferred embodiment of the present invention.

FIG. 2 is a block diagram illustrating a computer system that suitable for practicing the preferred embodiment of the present invention. The computer system 142 includes a central processing unit (CPU) 144 and a keyboard 146. The computer system 142 may also include additional peripheral devices, such as a mouse 148 and a video display 150. The computer system 142 may include a modem 152 to enable the computer system to communicate with remote computer resources over telephone lines and a network adapter 154 that enables the computer system to be interfaced with a network. The computer system 142 includes primary storage 160 and secondary storage 156. The secondary storage 156 may hold one or more customer profiles 158. The secondary storage 156 may take many forms, including disk drives and CD-ROM drives that hold computer-readable storage mediums. The primary storage 160 may include a copy of an email program 162 that is able to send and receive emails from the computer system 142. A copy of the profile editor 164 may also be stored on the computer in the primary storage 160.

Figure 3:
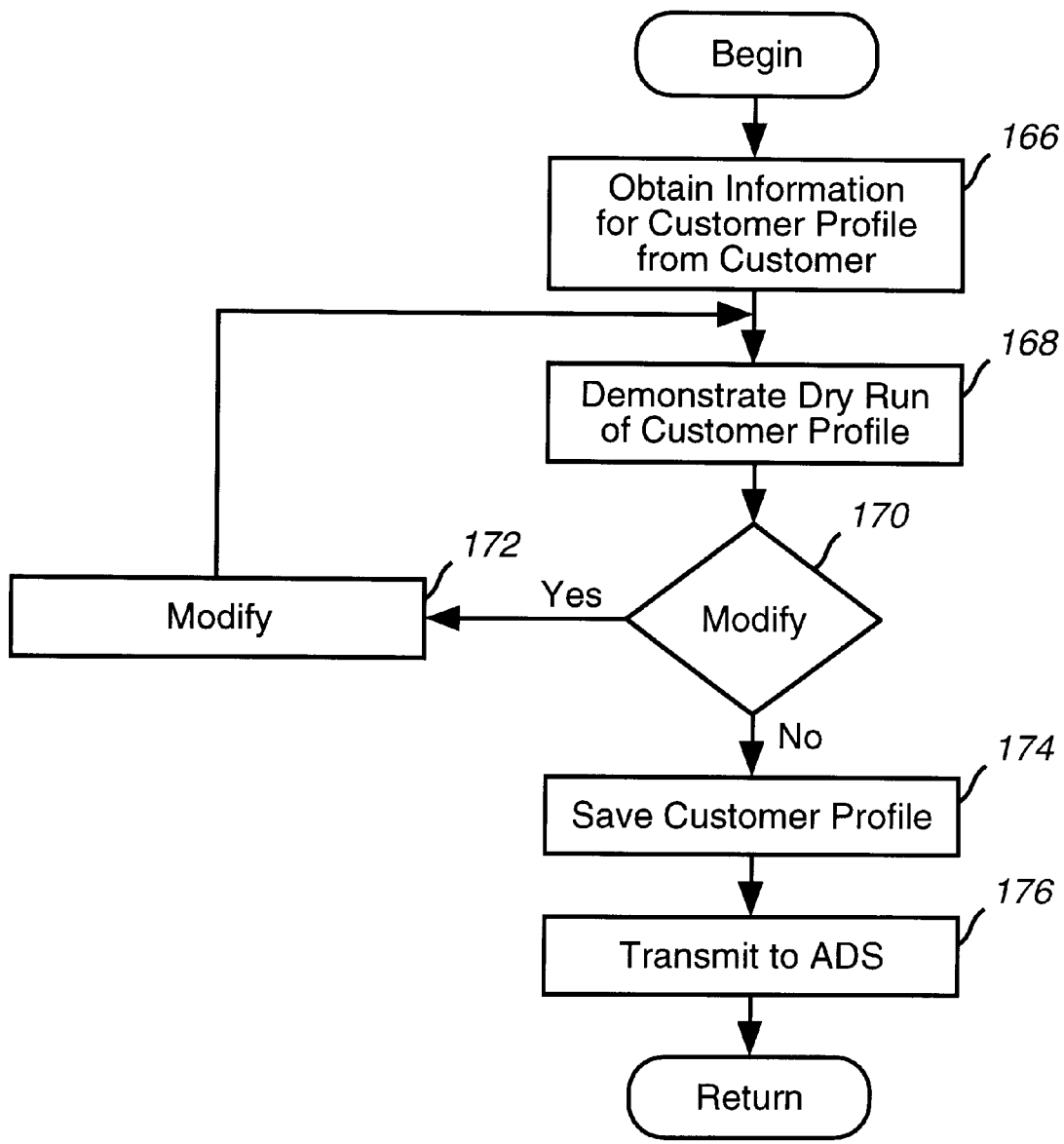
FIG. 3 is a flowchart illustrating the steps that are performed to create a customer profile.

One of the primary roles of the profile editor 164 is to create new customer profiles. FIG. 3 is a flowchart illustrating the steps that are performed to create a new customer profile. Initially, a marketing representative visits a customer, such as the customer's business site in the field. The marketing representative then uses the profile editor to obtain information to develop a customer profile from the customer (step 166 in FIG. 3). As will be described in more detail below, the profile editor includes a user interface that guides a marketing representative in obtaining the requisite information for developing a customer profile. In addition, the profile editor provides a user interface for entering and storing such information. Once all of the information has been obtained, the marketing representative may demonstrate a dry run of the customer profile by running a test version of the operator console program to demonstrate to the customer how the customer profile will be used by an operator in receiving calls on behalf of the customer (step 168 in FIG. 3). This dry run serves as a basis for the customer to make certain that the customer is happy with the customer profile and how it will be used by operators at the call center. After seeing the dry run of the customer profile, the customer makes a decision whether to modify the customer profile or not (step 170 in FIG. 3). If modifications are necessary, the modifications are made (step 172 in FIG. 3) and the updated customer profile may then be given a dry run, as was discussed above. Once the client is happy with the customer profile, the customer profile is saved (step 174 in FIG. 3). The marketing representative then transmits the customer profile via email over the email network 134 (FIG. 1) to the ADS 132 (step 176 in FIG. 3). The ADS 132 performs validation of the customer profile data and makes the customer profile information available to the call centers that will be servicing the customers. In particular, the ADS 132 sends the customer profile over the LAN/WAN 130 to the boot server 124 of the call centers 105 that will be servicing the customer. The ADS 132 maintains an internal configuration file that determines what boot servers 124 to send a given customer profile. As a result, customer profiles can be created virtually anywhere and distributed to any number of call centers to which the customer profiles are needed.

Figure 4:
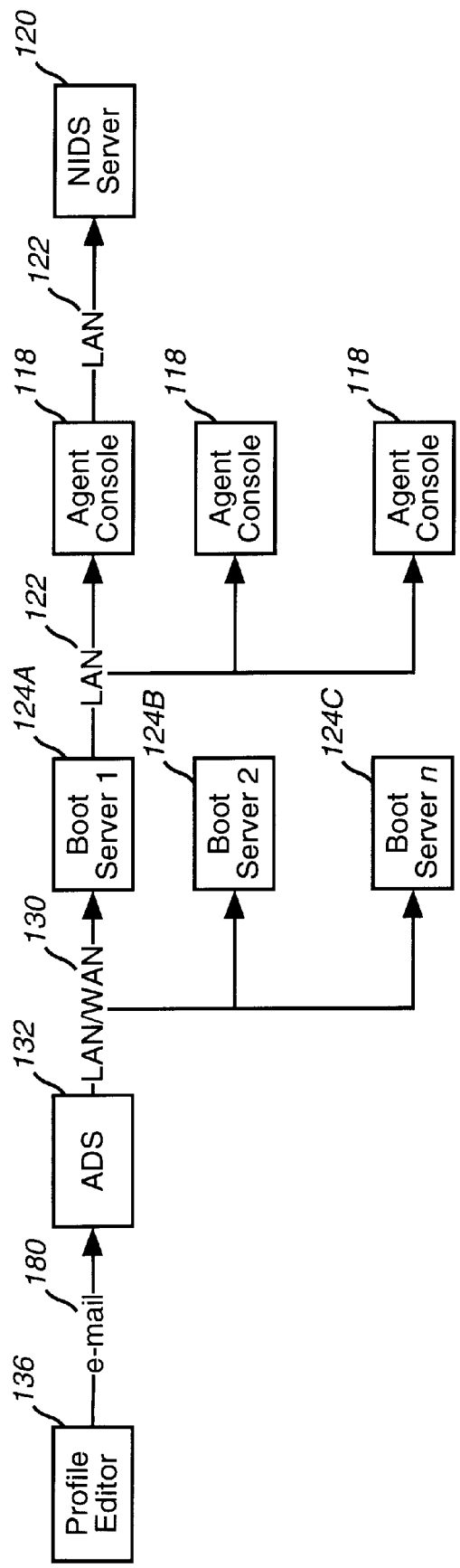
FIG. 4 is a diagram that illustrates the interaction between components of FIG. 1 in creating and using customer profiles.

FIG. 4 illustrates the flow of a customer profile from the profile editor 136 to the other components within the call center. As it mentioned above, the profile editor 136 emails (see arrow 180 in FIG. 4) the customer profile to the ADS 132. The ADS sends the customer profile over a LAN/WAN 130 to one or more boot servers. In the example shown in FIG. 4, the customer profile is sent to boot servers 124A, 124B, and 124C. The boot servers 124A, 124B, and 124C then distribute the customer profiles to applications running on agent consoles 118 as needed. In the examples shown on FIG. 4, the boot server 124A distributes customer profiles over a LAN 122 to three agent consoles 118. As is described in copending application entitled "System and Method For Providing Call Center-Based Customer Surveys," which is filed on even date herewith, which is assigned to a common assignee in which it is explicitly incorporated by reference herein, application programs running on the agent consoles utilize the customer profiles to customize the handling of calls on behalf of the customers. These applications compile data collected from the caller into records that are sent over LAN 122 to an NIDS server 120. These records are added to a database maintained on the NIDS server 120.

Figure 5:
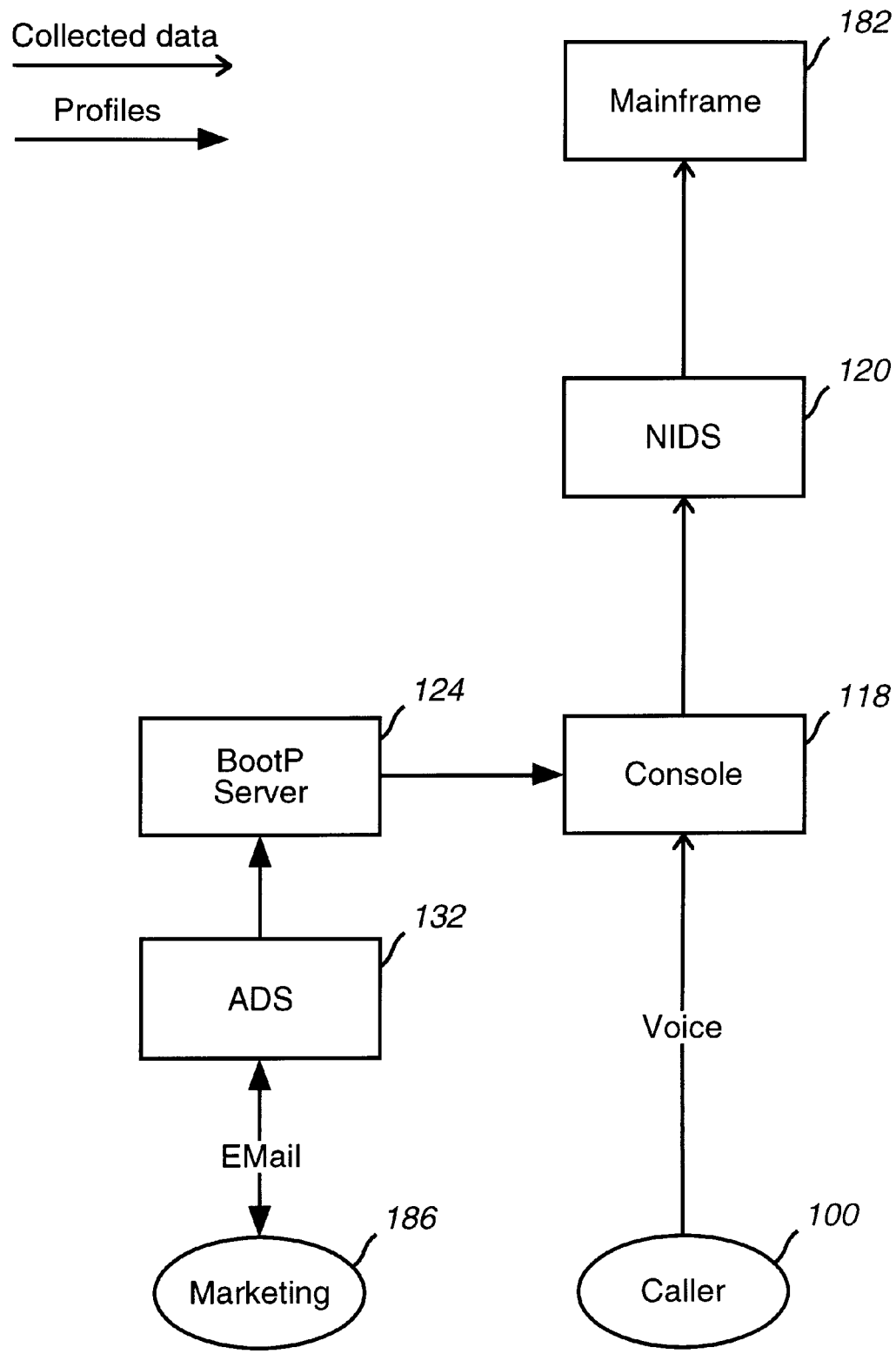
FIG. 5 illustrates data flow between various components within the environment of FIG. 1.

FIG. 5 illustrates the flow of collected data in profiles throughout the call center. A caller 100 provides information over a voice link to an operator on an operator console 118. Programs on the operator console 118 generate records in response to the call, as discussed above, which are sent to the NIDS server 120. The NIDS server 120 may be connected to a mainframe computer system 182 that is responsible for maintaining a large database of call center information.

Figure 6:
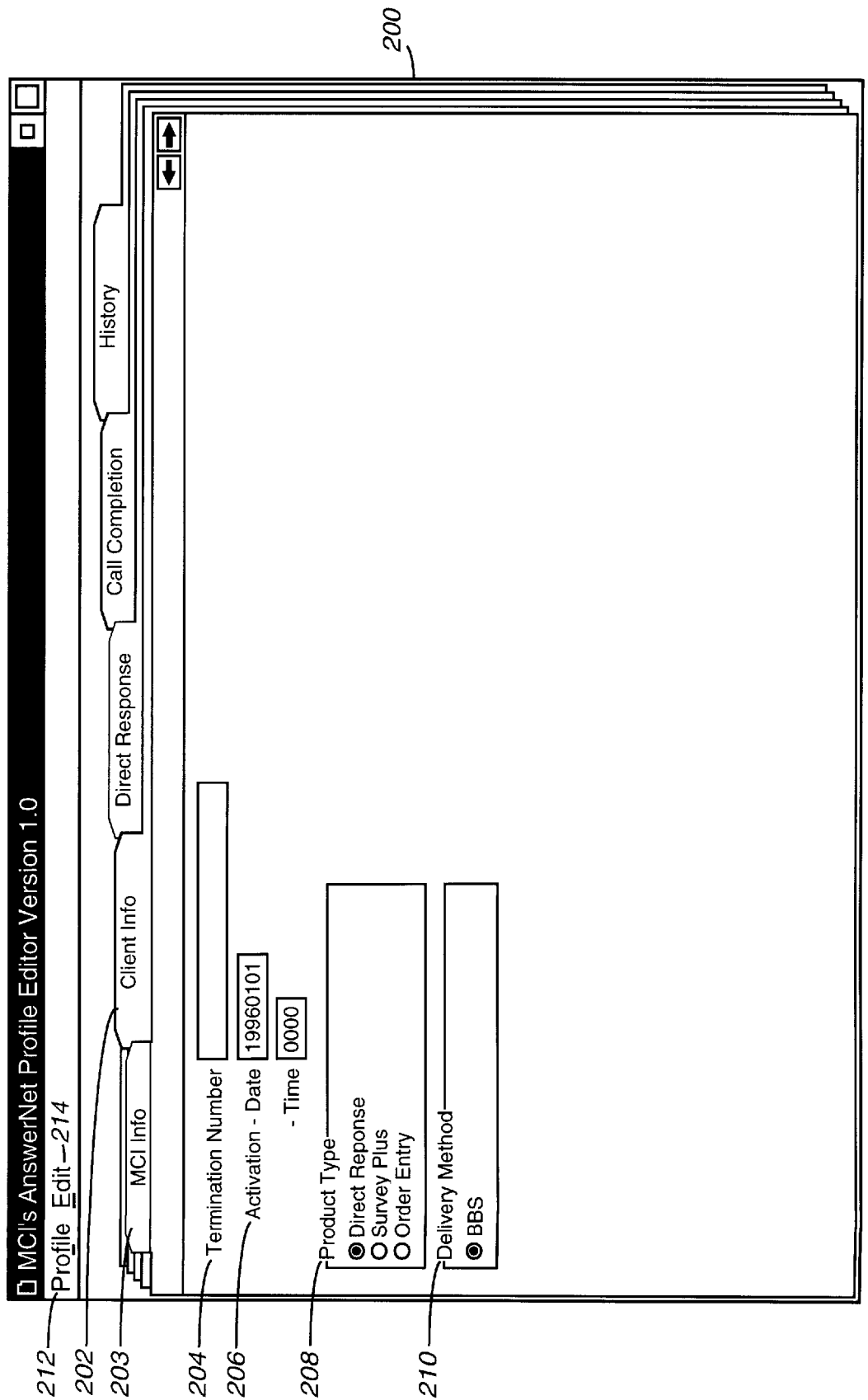
FIG. 6 shows an example MCI Info page of the profile editor.

The discussion below will now focus on the operation of the profile editor to obtain customer profile information. FIG. 6 depicts a window 200 that is produced by the profile editor when initiated. This window 200 includes a menu bar that has a profile menu 212 and an edit menu 214. A user may select the profile menu 212 and choose an option for creating a new profile. In such an instance, the client area of the window 200 appears as shown in FIG. 6. In particular, the client area appears like a notebook having tabbed pages. In particular, five notebook tabs are visible: MCI Info, Client Info, Direct Response, Call Completion, and History. FIG. 6 depicts an instance in which the MCI Info tab 203 has been selected. The page associated with the tab is used by a marketing representative to specify information that is needed to place a customer profile into production. A termination number field 204 defines the 800 number for an 800 number customer. In particular, a marketing representative may enter the appropriate 800 number into the termination number field on the page. Activation fields 206 are also provided to specify the date and time by which the profile should become active. A block of product-type buttons 208 are displayed to enable the marketing representatives to select the product type for the customer. A block of buttons specifying a delivery method 210 are also displayed.

Figure 7:
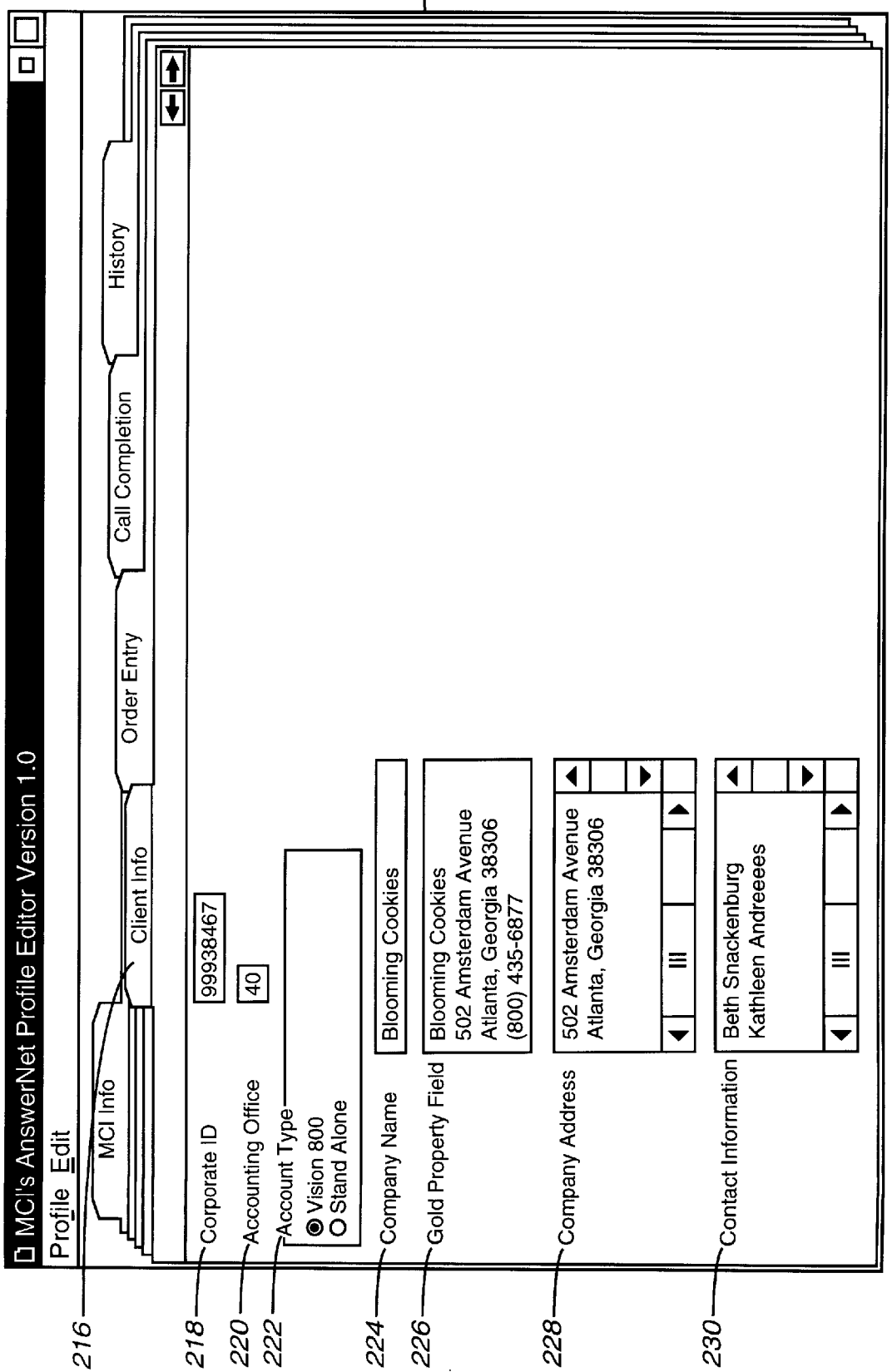
FIG. 7 shows an example Client Info page of the profile editor.

If the marketing representative desires to gather client information, the marketing representative clicks on the Client Info tab 216, as shown on FIG. 7. A corporate ID field 218 is provided to enter a numerical identifier that identifies the customer for billing purposes. An accounting office field 220 allows the entrance of an accounting office field, and a account-type block of buttons 222 allows the marketing representative to specify the type of account for the customer for billing purposes. A company name field 224 is provided for the marketing representative to enter the name of the customer. The gold property field 226 and company address field 228 are provided to hold customer address information. A contact information field 230 is provided to specify a contact person for the customer.

Figure 8:
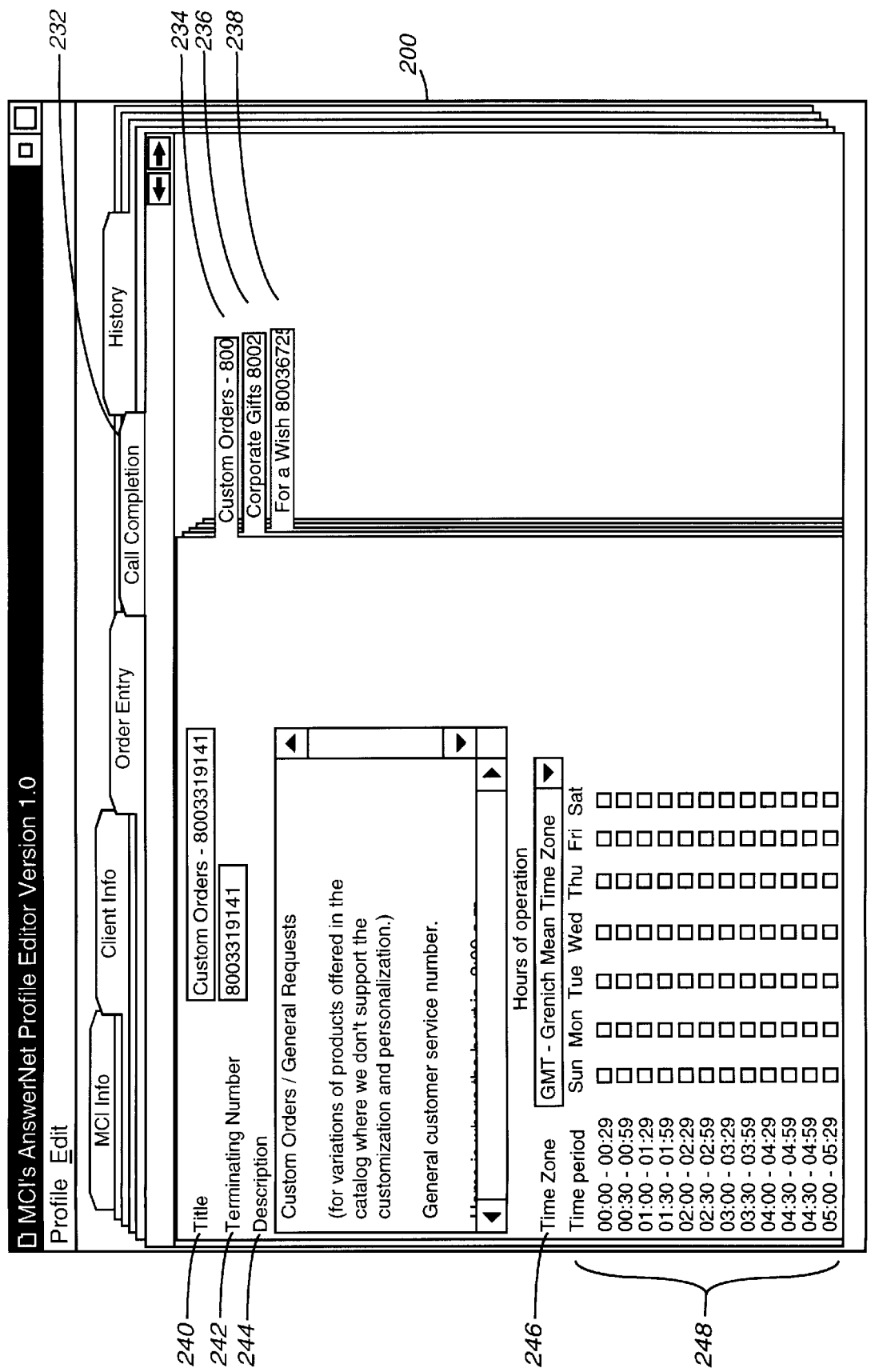
FIG. 8 shows an example Custom Orders Call Completion page of the profile editor.

A marketing representative may select a call completion page by selecting the call completion tab 232, as shown in FIG. 8. The call completion page is used to define customer service numbers available to the agent or operator at the call center. As can be seen in FIG. 8, multiple pages may be held under this tab. Separate subtabs 234, 236, and 238 are provided for different types of orders. Tab 234 is selected in an example shown in FIG. 8 and concerns customer service numbers for custom orders. The title field 240 may be used by the marketing representative to enter the title of the page. The terminating number field 242 is used to enter the telephone number that may be called for the associated type of order. A description field 244 provides a long description to the operator. A time zone field 246 can be used to specify a time zone for the time period/day-of-the-week buttons 248. These buttons 248 may be checked to indicate the call may be transferred to the terminating number associated with the page during the specified day and time period.

Figure 9:
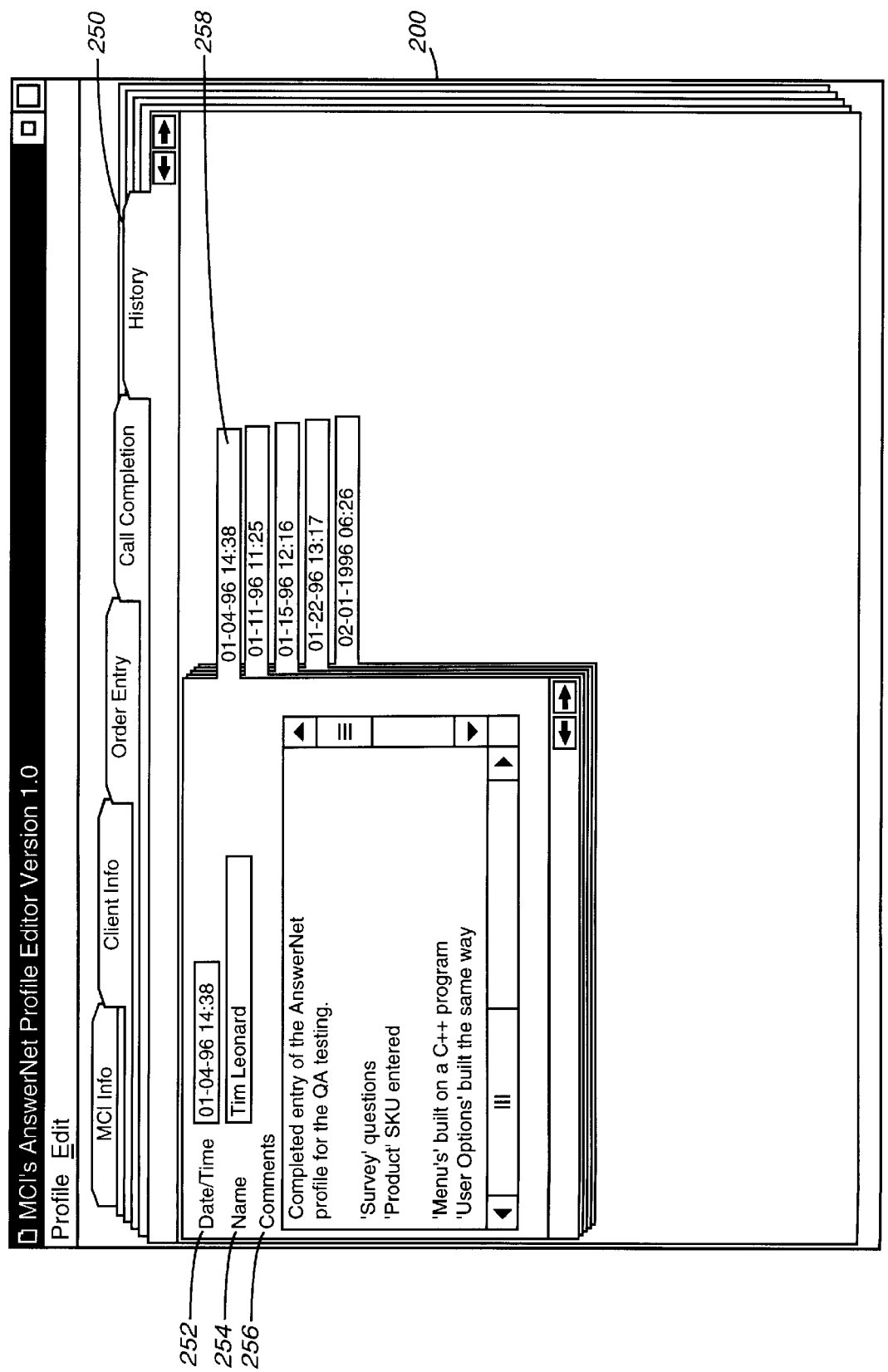
FIG. 9 shows an example History Note describing a modification to a customer profile in the profile editor.

The marketing representative may also select the history tab 250 (FIG. 9) to display a history page. This history page is used to keep track of changes to a customer profile. A tab 258 is displayed with each change entry. The marketing representative may fill in the date and time in the date/time field 252 and may specify his name in the name field 254. Comments may be set forth in the comments field 256.

Figure 10A:
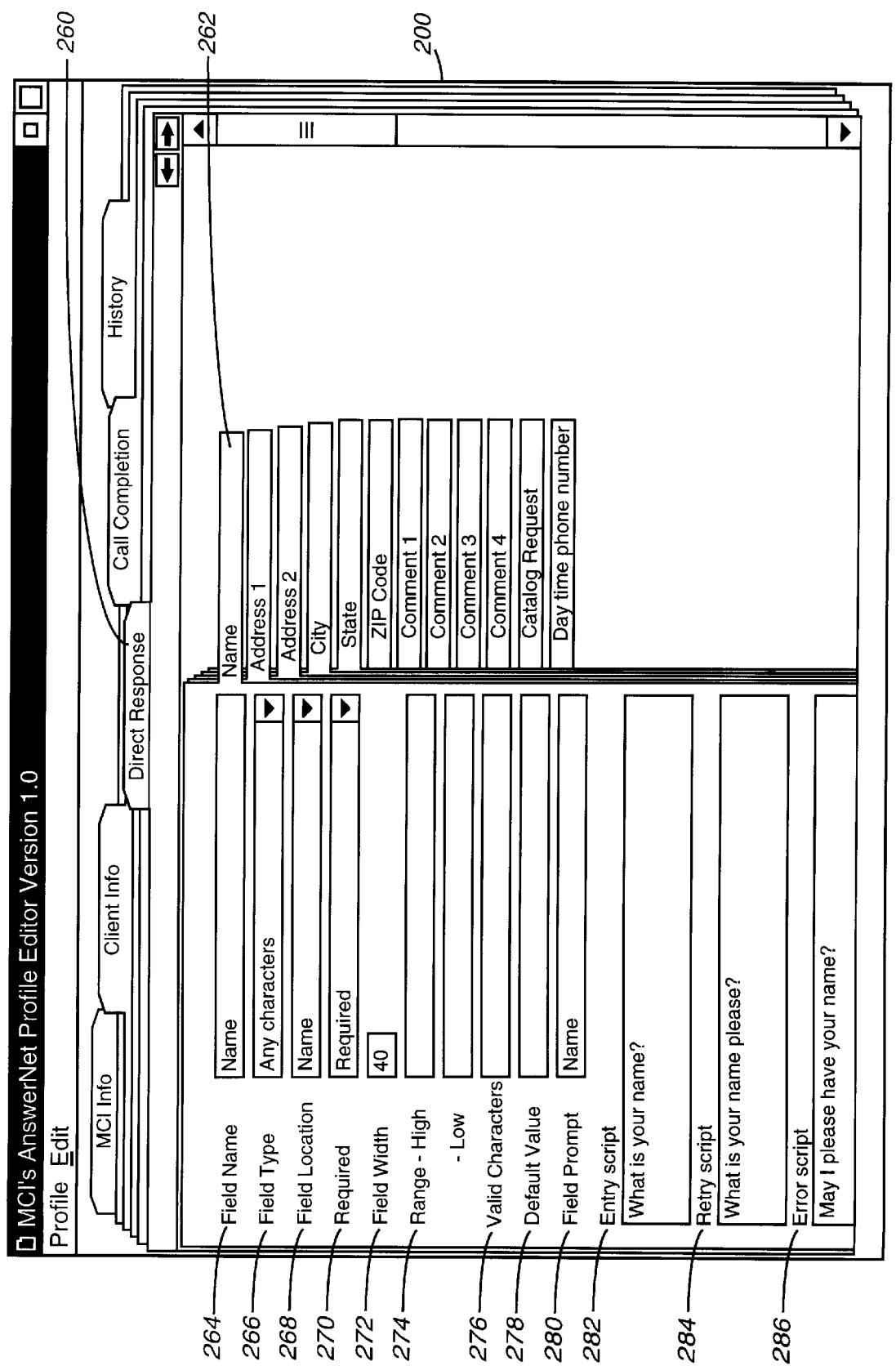
FIGS. 10A and 10B illustrate data for collecting name information with the profile editor.
Figure 10B:
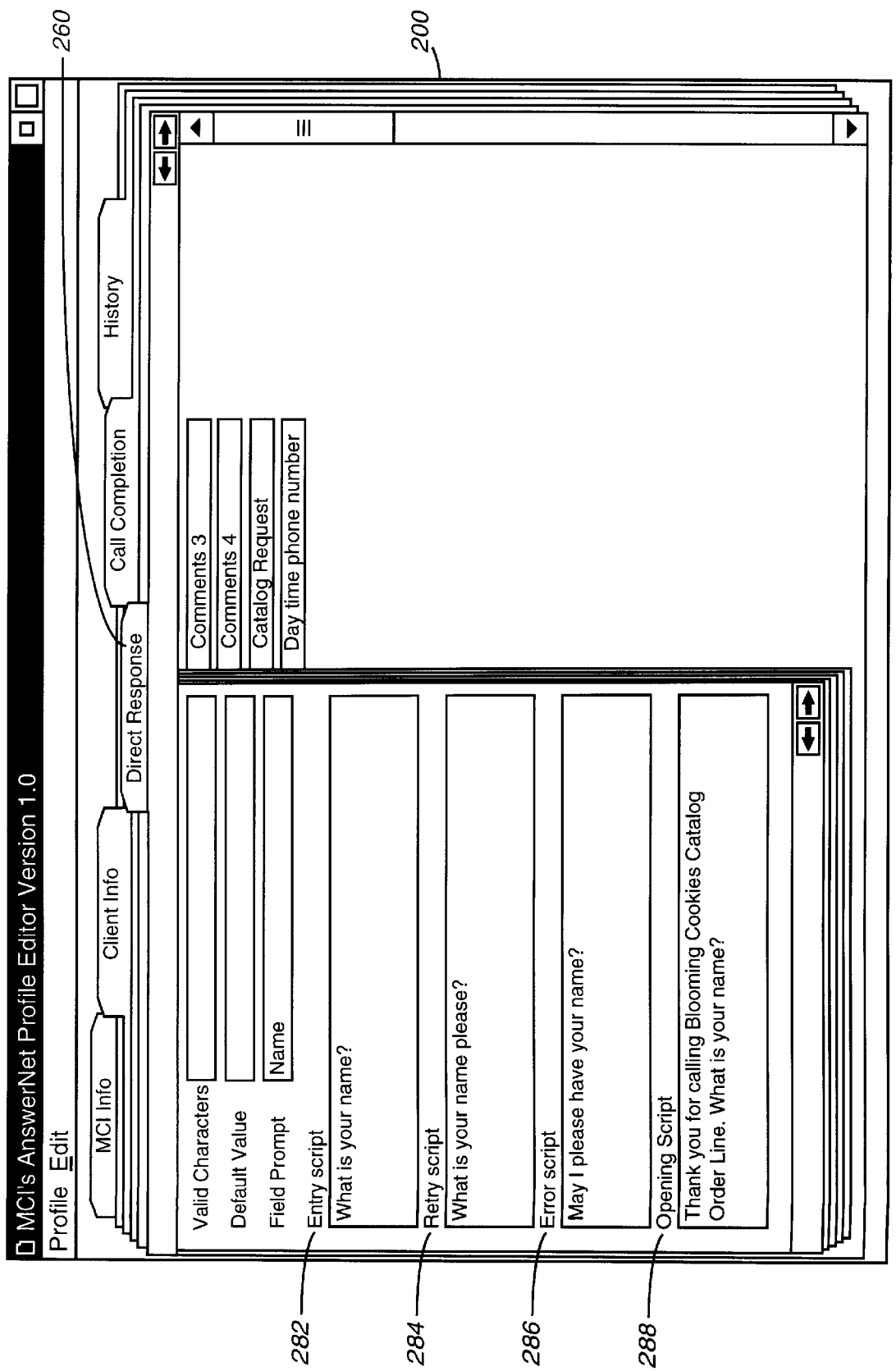

The marketing representative may select the direct response tab 260 (see FIG. 10A) to select from a number of fields. Each field has a separate tab associated with it. In FIG. 10A, the tab 262 for the name field is selected. The page associated with the name field holds a number of fields regarding information that should be specified relative to obtaining the name of a caller by an operator. This name field includes information for specifying the script to be used by the operator and obtaining a name from a caller. The field name field 264 may be used to identify the associated field name. The field type field 266 may be used to specify the type of the associated name field. The field locator field 268 is used to specify where the field is located, and the required field 270 is used to specify whether this is a field (e.g., the name field) that must be obtained to complete the customer profile. The field width field 272 is used to specify the width of the field in bytes. The range field 274 is used to specify a high and low acceptable range for the field. The valid characters field 276 are used to specify what characters are valid for the field. The default value field 278 is used to specify the default value for the field, and the field prompt field 280 is used to specify a prompt that is to be used to obtain the field. The entry script field 282 is used to enter text that is to be displayed as part of a script when the operator positions the cursor on the associated field. The retry script 284 enables the entrance of a script that is to be displayed when a field is selected at the operator console that has already been previously visited by the operator. The error script field 286 enables a marketing representative to enter a script the operator uses when an error has occurred, such as the entrance of invalid information in the customer profile. As FIG. 10B shows, an opening script field 288 is provided for entering an initial greeting that is provided by the operator in processing a call.

As can be seen in FIG. 10A, separate fields are provided for addresses, catalog requests, and telephone numbers that need to be gathered for caller orders. These fields may be utilized to specify appropriate values for information that is to be gathered as part of the customer profile and to specify scripts for obtaining those values. These fields may also specify whether the values are required or not and may specify how the gathered information is mapped into the data that is stored in the customer profile.

FIG. 10C shows an example of the appearance of an operator console that uses a customer profile that is specified in an entry script for the name field. This script is displayed in an upper portion 291 of the operator console 290. The text 292 of the entry script is displayed and additional information 294 obtained from the name information is displayed underneath the text.

Figure 11A:
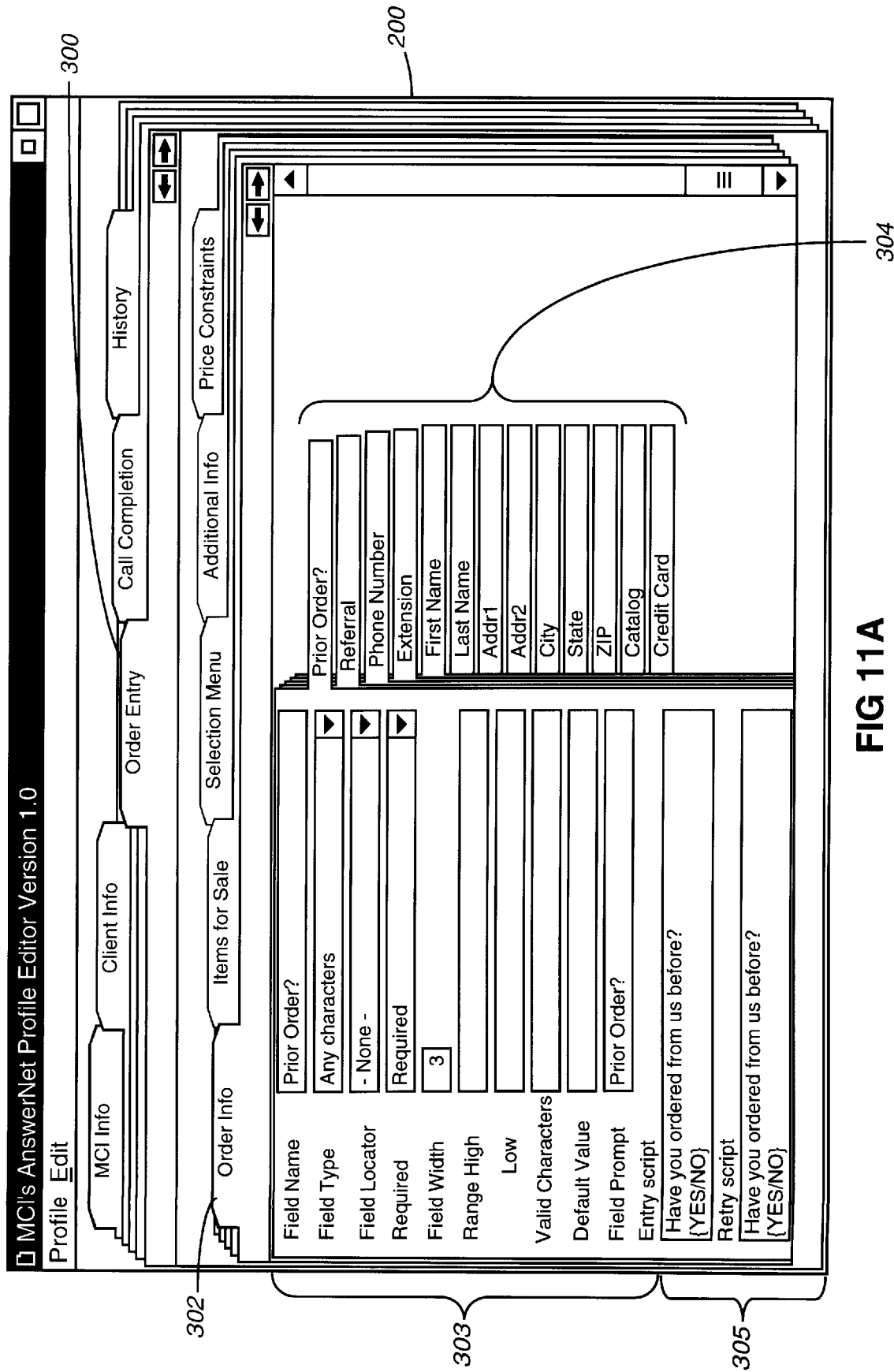
FIGS. 11A and 11B illustrate an example Order Information page of the profile editor.
Figure 11B:
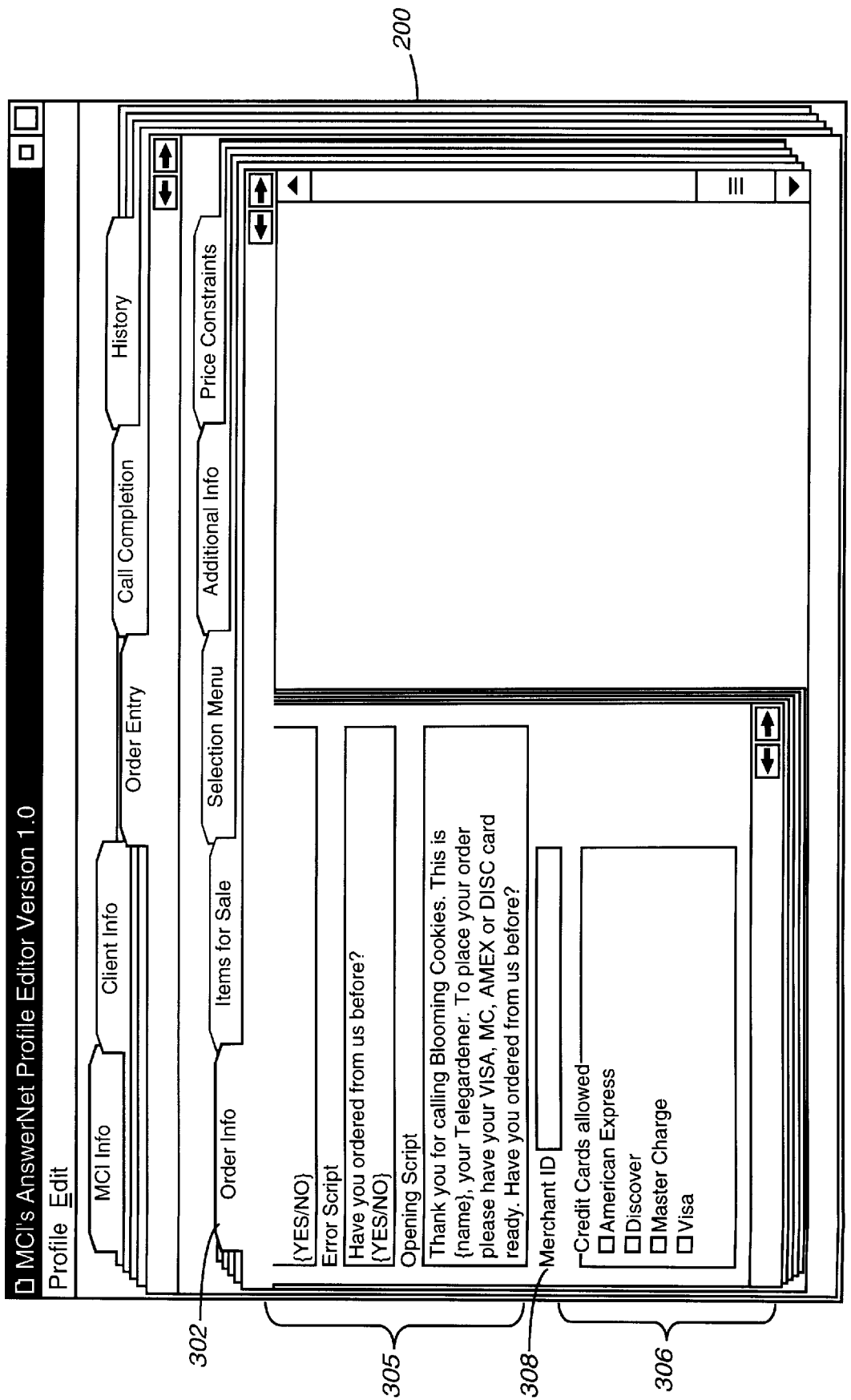

The marketing representative may also select the order entry tab 300 (see FIG. 11A) to obtain information for a customer regarding order entry as part of the customer profile. Separate tabs 304 may be provided for separate pages for different types of borders and order information. In general, a separate page may be provided for each field that is to be obtained for order entry. In particular, a separate page is used to define each set of questions that are required for order entry by an operator for a given field. In an example shown in FIG. 11A, the prior order page is selected. The prior order page includes a number of fields 303 like those described above in FIGS. 10A and 10B. For specifying parameters regarding a given field, in an example shown in FIG. 11A, the field is the prior order field, and it indicates whether or not a caller has previously ordered from a customer. Scripts may be specified in script fields 305. In addition, a merchant ID field 308 may be included, and buttons 306 may be used to specify what credit cards are permissible for customer sales.

Figure 12:
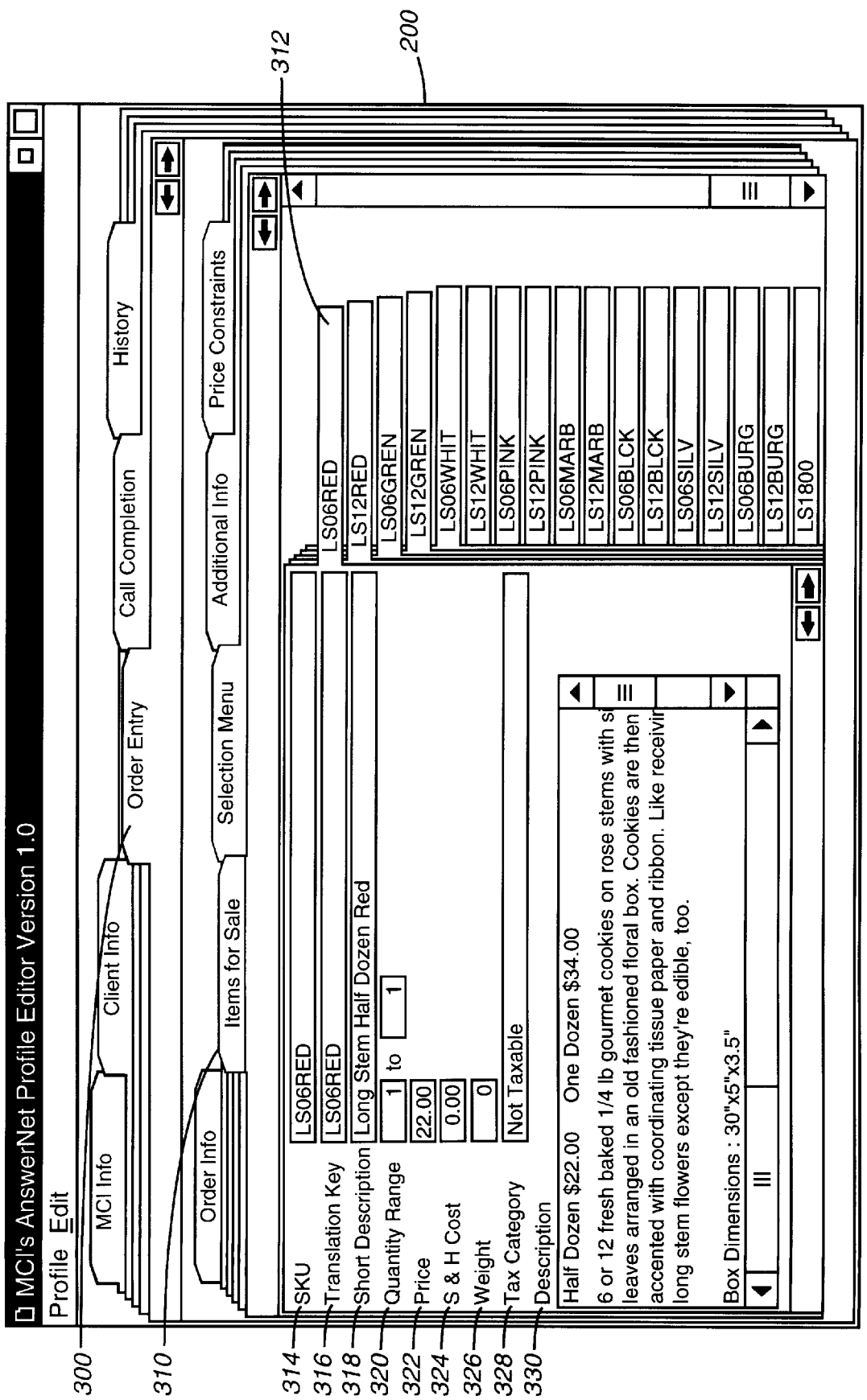
FIG. 12 illustrates an example item page for the profile editor.

The marketing representative may also select the items for sale tab 310 (FIG. 12) to display the items for sale page. The items for sale page is used to define what items are for sale by a given customer. The SKU field 314 is used to specify the stockkeeping unit (SKU) code for a given product. Each product has an associated tab (EG tab 312) and a separate associated page. A translation key field 316 may be used to enter a translation key for ordering an item. The short description field 318 is used to enter a short description of the item. The quantity range field 320 is used to hold a low value and a high value to define a range for quantity discounts. Most items use default values of 1 to 1, which implies that each item's cost and shipping and handling charge are multiplied by the quantity. The price field 322 is used to hold the price of the item, and the S&H cost field 324 is used to hold the additional shipping and handling cost that is charged for the item. The weight field holds a value that is used when the shipping and handling charges are determined by the total weight of an order. The tax category field 330 is used to identify the tax category for the item. The description field 332 may be used to enter a description of the item.

Figure 13A:
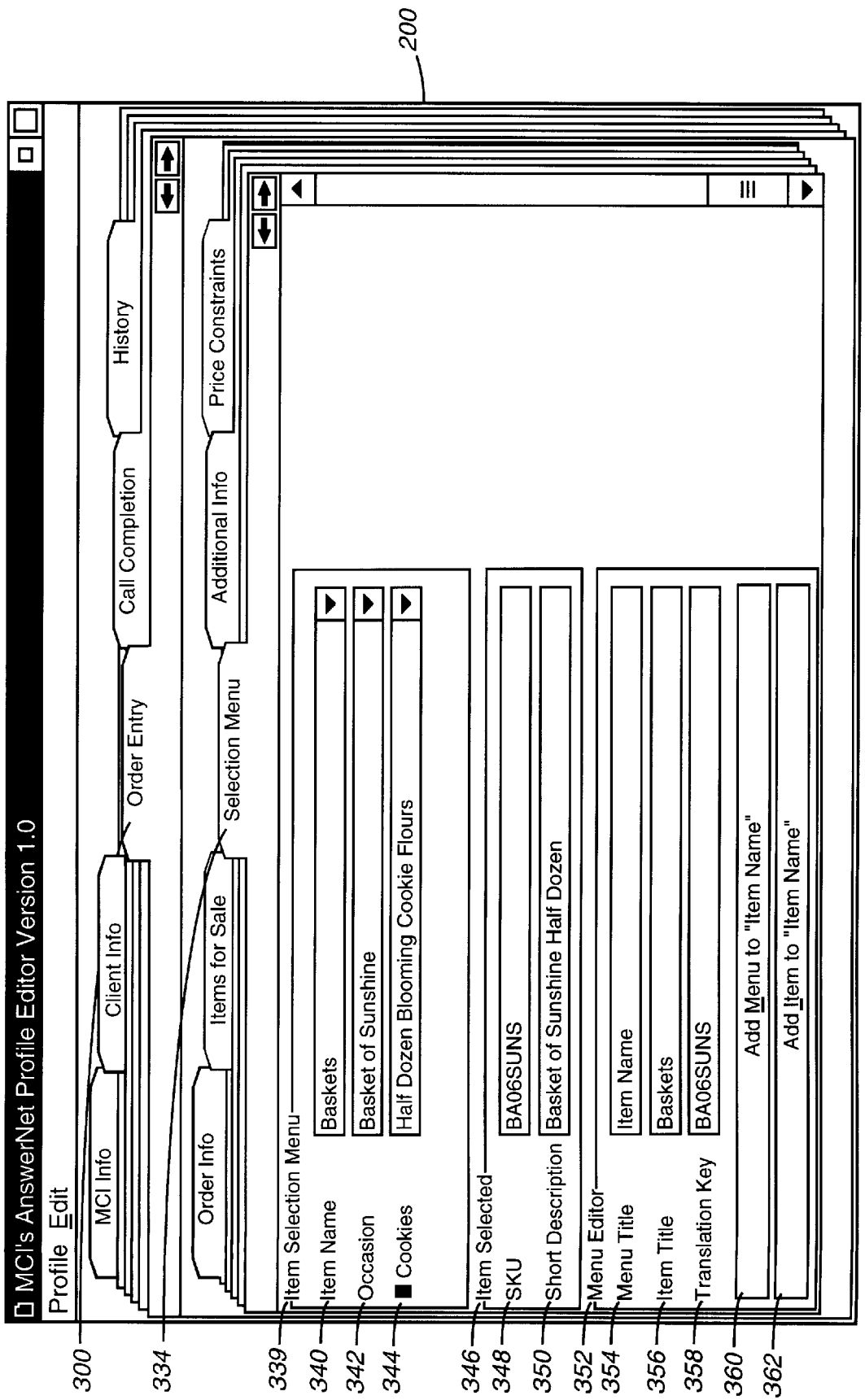
FIGS. 13A and 13B illustrate an example of the selection menu editor of the profile editor.
Figure 13B:
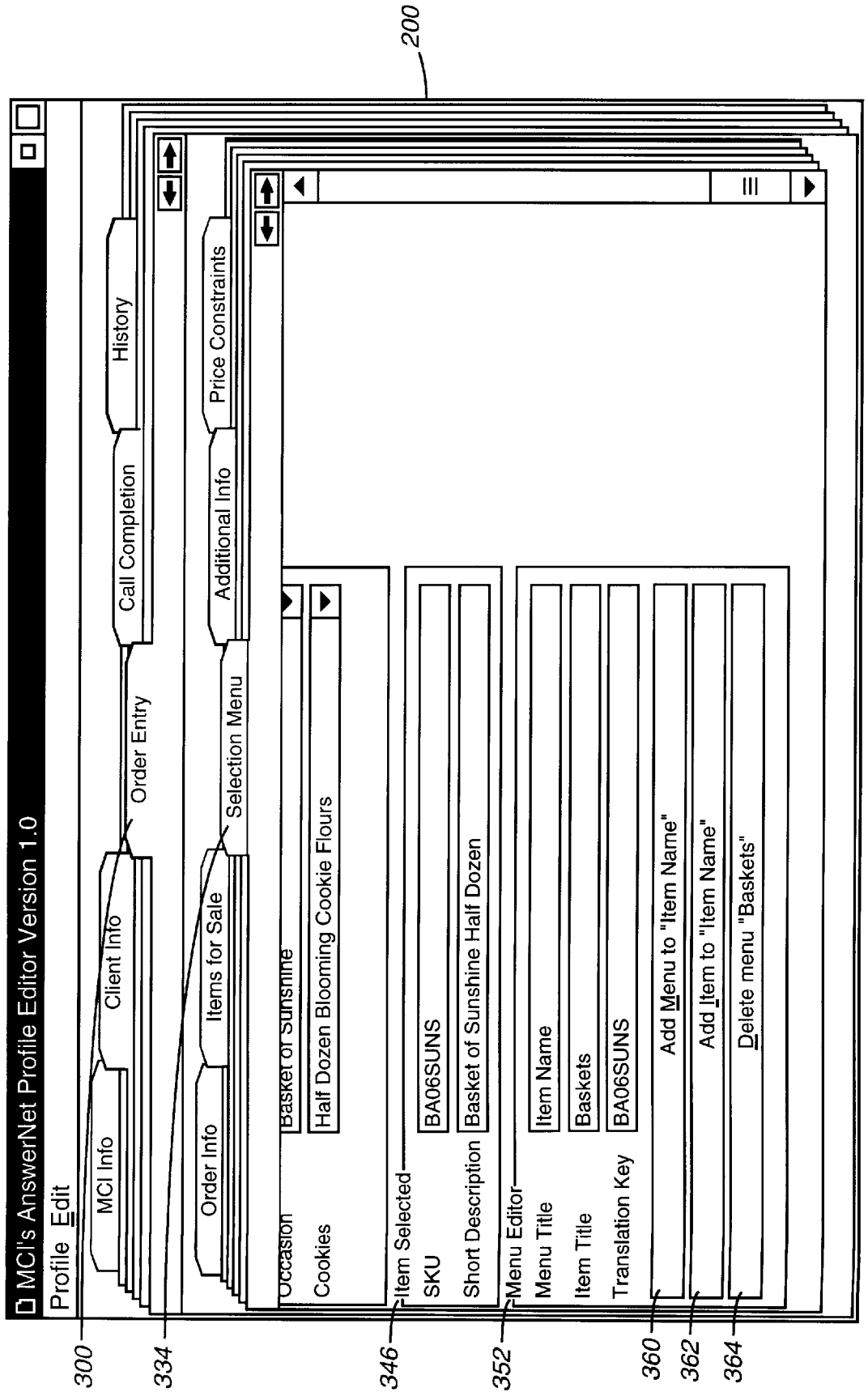

The marketing representative may also select the selection menu tab 334 (see FIGS. 13A and 13B). The selection menu tab causes a selection menu editor to be displayed that is used to define a menu that can be used by the operator to select items to order. The selection menu editor includes three main parts: the item selection menu 339, the item selected part 346, and the menu editor 352. The item selection menu 339 includes fields 340, 342, and 344 in FIG. 13A and resembles a menu that is presented to the operator to select items to order. The item selected part 346 includes fields 348 and 350 in FIG. 13A and assumes the item that corresponds to the currently selected item on the item selection menu part 339. The menu editor part holds fields that are used to edit the item selection menu part 339. FIGS. 13A and 13B depict an example of a selection menu with an item that is defined three levels deep. In this example, the first menu level (i.e., "item name") is currently selected. The values "item name" and the menu title field 354 of the menu editor 352 and the value "baskets" in the item title field 356 of the menu editor 352 corresponds to the first level menu in the item selection menu 339. The value "BA12SUNS" in the translation key field 358 of the menu item corresponds to the item identified by the combination of values in three menu levels 340, 342, and 344 in the item selection menu. In the example, this corresponds to a basket of sunshine holding half dozen blooming cookie flowers.

A number of modifications to a menu may be made using the selection menu editor. For example, the title of a menu may be edited by changing the text in the menu title field 354. The title of an item in a drop down box for field 354 may be edited by selecting the item and then changing the text in the item title field 356. A translation key may be edited by modifying the text within the translation key 358. A menu entry may be added to the currently selected level by pressing the ADD menu button 360. An item may be added to a currently selected level by pressing the ADD item button 362. A menu item may be deleted by pressing the DELETE button 364.

Figure 14:
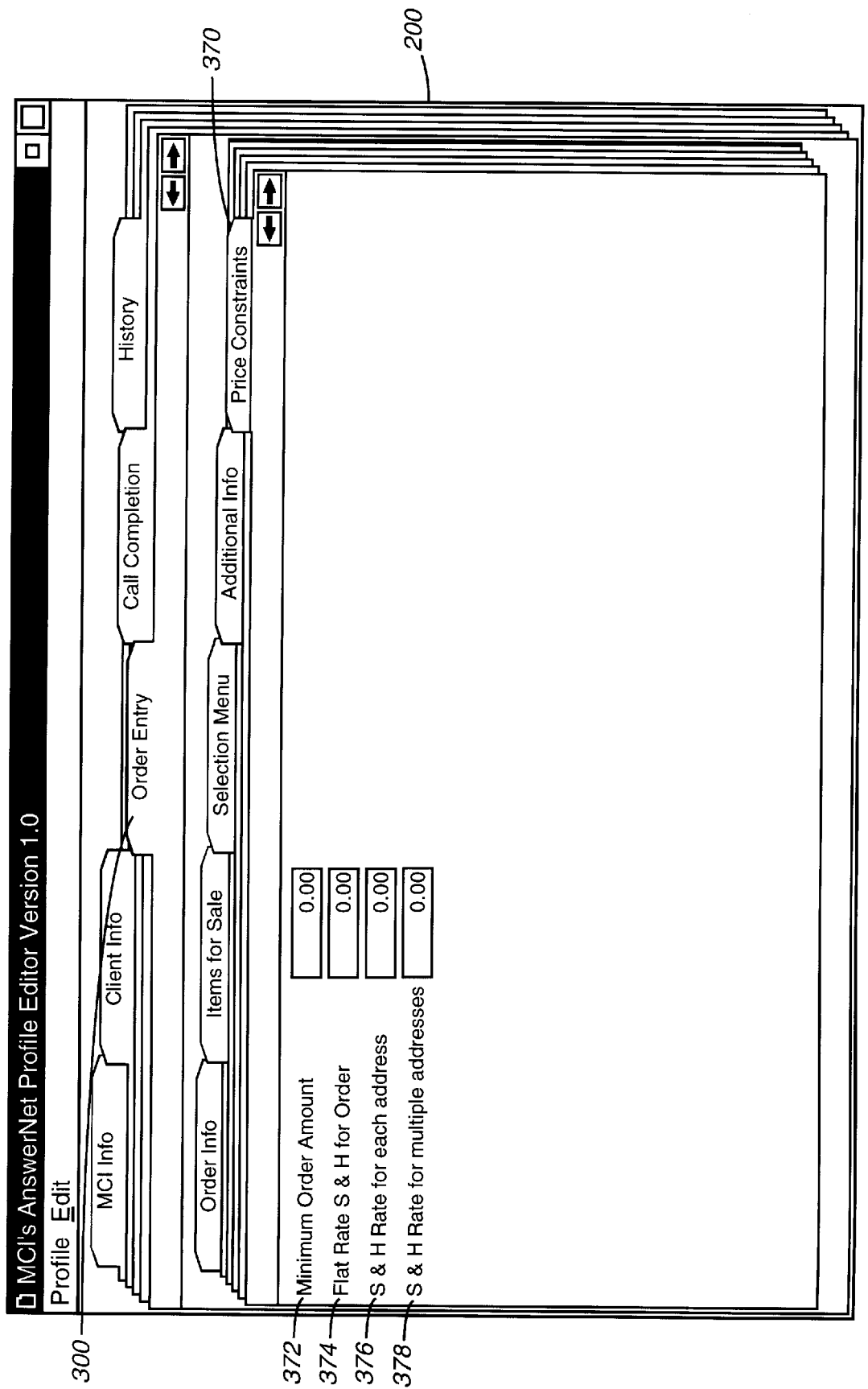
FIG. 14 illustrates an example price constraints page of the profile editor.

The marketing representative may specify price constants for an order by selecting the price constants tab 370 (FIG. 14). A minimum order field 372 specifies a minimum order dollar amount. Field 374 holds a value for a flat rate for shipping and handling for an order. Field 376 holds a value specifying the shipping and handling rate for each address when multiple addresses are specified for an order, and field 378 holds shipping and handling charges for shipping an order to multiple addresses.

Figure 15:
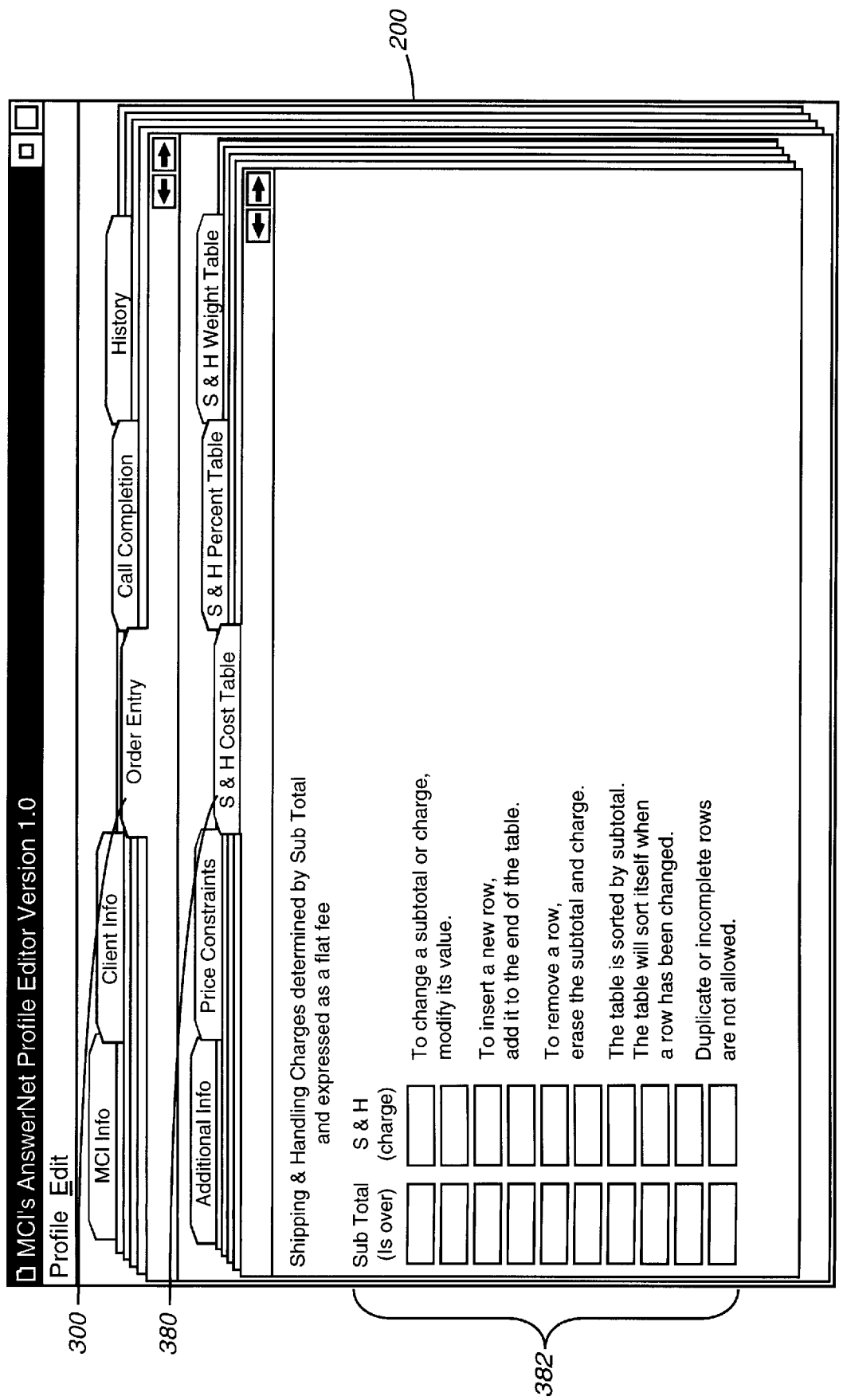
FIG. 15 illustrates an example shipping and handling cost table page of the profile editor.

Additional shipping and handling information may be specified by selecting the shipping and handling cost table tab 380 (FIG. 15). This causes the associated table 382 to be displayed. The table 382 accommodates the specification of up to ten levels of shipping and handling price break charges. This table is utilized to determine the shipping and handling charge based upon the cost of the order.

Figure 16:
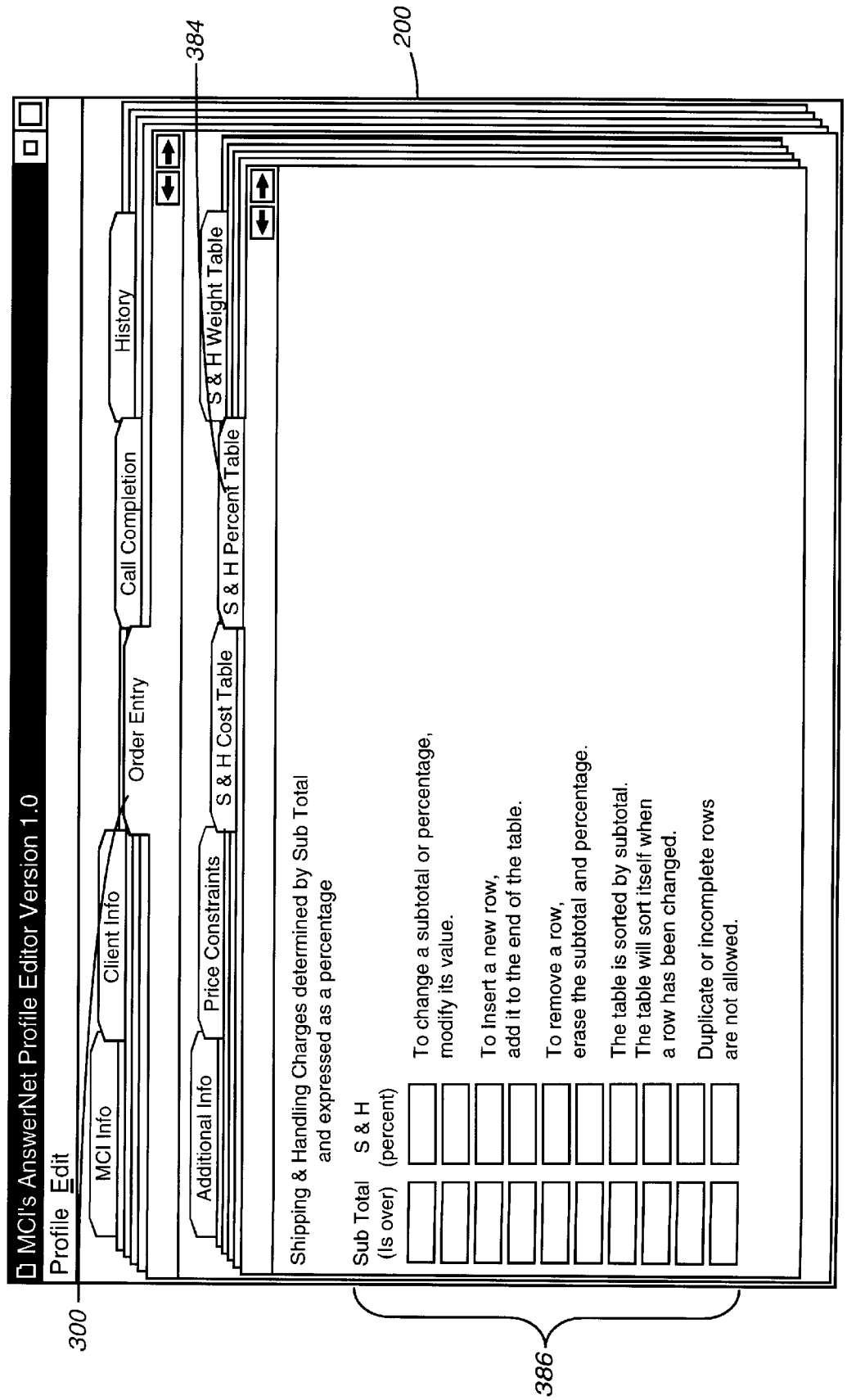
FIG. 16 illustrates an example shipping and handling percent table page of the profile editor.
Figure 17:
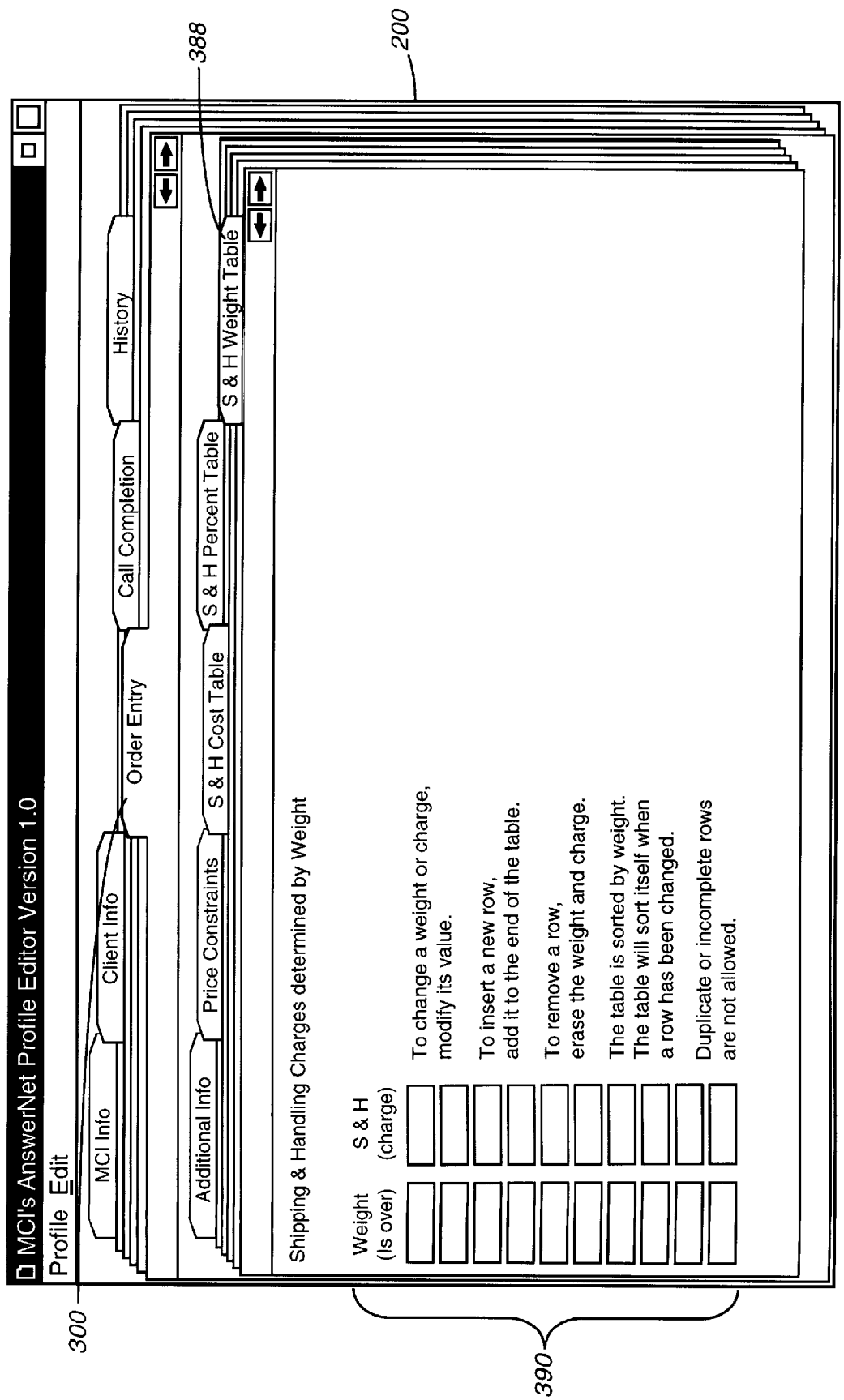
FIG. 17 illustrates an example shipping and handling weight table page of the profile editor.

The marketing representative may configure a shipping and handling percentage table by selecting the shipping and handling percent table tab 384 (FIG. 16). As shown in FIG. 16, this table accommodates the specification of up to ten levels of shipping and handling price break charges. Similarly, the marketing representative may configure a shipping and handling weight table by selecting the shipping and handling weight table tab 388, shown in FIG. 17. The shipping and handling weight table 386 accommodates the specification of up to ten levels of shipping and handling price break charges based upon weight.

As was discussed above, the marketing representative completes the appropriate fields to develop the customer profile. This information is stored in a tag/length/data format. Each tag is 4-bytes wide and identifies the type of information that is included in the data. A length field follows the tag field and is 4-bytes wide. The length field specifies the length of the data. The data consists of the data that is entered by the marketing representative as part of the customer profile.

Set forth below is a list of the tag definitions used for the customer profiles.

| TAG DEFINITIONS | |
|---|---|
| Tag | 00000000 - Comment (ASCII English) |
| Length | |
| Data | Null terminated ASCII String |
| Tag | 00000001 - Character String (ASCIIZ Format) |
| Length | |
| Data | Null terminated ASCII String |
| Tag | 00000002 - Character String (EBCDIC Format) |
| Length | EBCDIC Character Data |
| Data | |
| Tag | 00000003 - Unsigned numeric quantity |
| Length | 0000000C |
| Data | Intel ULONG |
| Tag | 00000004 - Signed numeric quantity |
| Length | 0000000C |
| Data | Intel LONG |
| Tag | 00000005 - Signed value (integer value in pennies) |
| Length | 0000000C |
| Data | Intel LONG (value in pennies) |
| Tag | 00000006 - Unsigned percentage |
| | (integer value: 1234 => 12.34%) |
| Length | 0000000C |
| Data | Intel LONG (value in pennies) |
| Tag | 00000010 - Range |
| Length | |
| Data | |
|   Required Tag (2) | |
| Minimum value | |
|   any numeric (incl weights) or character string | |
| Maximum value | |
|   any numeric (incl weights) or character string | |
|   (type must agree with minimum value) | |
| Tag | 00000011 - Field requirement flag |
| Length | 00000009 |
| Data | Byte |
| |   - 00 => Field is optional |
| |   - FF => Field is required |
| Tag | 00000012 - Width (in characters) |
| Length | 0000000A |
| Data | UBYTE - Recommended width |
| | UBYTE - Maximum width of collected data |
| | - 00 => No maximum limit |
| Tag | 00000013 - Height (in lines) |
| Length | 0000000A |
| Data | UBYTE - Recommended height |
| | UBYTE - Maximum height of collected data |
| | - 00 => No maximum limit |
| Tag | 00000014 - Data Type |
| Length | |
| Data | |
|   Positional Tags (Required in this order) | |
|     00000003 - Unsigned LONG; Indicates data type | |
|     Legal values | |
|     00000000 - any collectable value is allowed | |
|     00000001 - numeric data | |
|     00000002 - character data, spaces not allowed | |
|     00000003 - character data, optional tag | |
|       (any of character data) | |
|       specifies the legal characters | |
|       allowed [00000001, 000000002] | |
|     00000004 - display only (using default data) | |
|     00000005 - display only (using expression in default data) | |
|       [Phase 2] | |
| Required Tags | |
|   as specified in Positional Tag Section | |
| Optional Tags | |
|   00000010 - Range; defines legal range for collected values | |
|     (numeric or text) | |

| TAG DEFINITIONS-continued | |
|---|---|
| Tag | 00000015 - Field locator value; |
| |   used to find fields in a data group |
| |   (used by Tax Server) |
| Length | |
| Data | |
|   Any number of (must be at least one) | |
|     any character string | |
|     any numeric value | |
| Defined Values | |
|   any character string | |
|     "Name" - | |
|     "Address" - | |
|     "City" - | |
|     "State" - | |
|     "ZIP" - | |
|     "Country" - | |
|     "City, State" - | |
|     "City, State ZIP" - | |
|     "City, State ZIP Country" - | |
|     "Free form address" - | |
|     "Phone" - | |
|     "Day Phone" - | |
|     "Evening Phone" - | |
|   any numeric value | |
|     None defined | |
| Tag | 00000016 - Default value |
| Length | |
| Data | |
|   numeric value for numeric fields | |
|   any character string for entry field and MLEs | |
| Tag | 00000020 - Company Name (Character String) |
| Length | |
| Data | |
|   Required Tag (1) of | |
|     00000001 - ASCIIZ String | |
|     00000002 - EBCDIC String | |
|   Predefined Field Name for Company Name | |
|   "@Company Name" | |
| Tag 00000021 - Prompt text (Character String) | |
| Length | |
| Data | |
|   Required Tag (1) of | |
|     00000001 - ASCIIZ String | |
|     00000002 - EBCDIC String | |
| Tag | 00000022 - Field Name (Character string) |
| Length | |
| Data | |
|   any character string | |
| Tag | 00000023 - Info Area Text |
| Length | |
| Data | |
|   any character string - used to populate Info Area for this control | |
| Tag | 00000024 - Edit Mask |
| Length | |
| Data | |
|   any character string(s) - used to specify editor controls | |
|   (TBD - see CUA Specs) | |
| Tag | 00000025 - Output Format |
| Length | |
| Data | |
|   any character string(s) | |
|     Embedded strings starting with '@' should be translated using the | |
|     Field Names of collected data. Exact format of this data is TBD. | |
| Tag | 00000026 - Script Text |
| Length | |
| Data | |
|   any character string | |
| Notes | |
|   - Phase 1.0 can process this as a text string with format characters | |
|     (CR/LF) | |
|   - Phase 1.5 can access "^" variables from standard console | |
|   - Phase 2.0 can access AnswerNet Variable Data | |
|     (use '@' escape character) | |
| Tag | 00000027 - Key Information |
| Length | |
| Data | |
|   One byte     - indicates key | |
|     Valid values | |

TAG DEFINITIONS

```
    0x00 - Enter Key
    0x01 - SK1
    0x02 - SK2
    0x03 - SK3
    0x04 - SK4
    0x05 - SK5
    0x06 - SK6
    0x07 - SK7
Note: The following keys must be overridden or turned off
    0x08 - ESCAPE Key
    0x09 - F1
    0x0A - F2
    0x0B - F3
    0x0C - F4
    0x0D - F5
    0x0E - F6
    0x0F - F7
    0x10 - F8
    0x11 - F9
    0x12 - F10
    0x13 - F11
    0x14 - F12
    0x15 - SHIFT F1
Positional Tags (two)
  any character string - Text for Key Cap
    value of " " for keys >= 0x08
  any character string - Name of Label to branch to
    value of " " indicates key is to be turned off
Tag     00000028 - Field Information
Length
Data
  Positional Tags
  Required Tags
    00000012 - Width (in characters)
    00000014 - Field Type
    00000021 - Prompt Text
    00000022 - Field Name
    00000025 - Output Format
  Optional Tags
    00000015 - Field Locator
    00000016 - Default value
    00000023 - Info Area Text [Phase 2]
    00000024 - Edit Mask     [Phase 2]
Tag     00000029 - Field Scripts
Length
Data
  Required Tags
    00000026 - Script text - Entry script
  Optional Positional Tags
    00000026 - Script text - Retry Script
    00000026 - Script text - Error Script
Note: Opening Script is a special tag associated with the entire profile
Tag     00000030 - Opening Script (one per profile)
Length
Data
  0000026 - Script text
Tag     00000031 - Menu Item Information
Length
Data
  One byte - indicates short cut key
    Valid values
      0x00 - No short cut key
      ASCII - ASCII Key Value (upper or lower case, numeric)
  Positional Tags (two)
    any character string - Text of Menu Item
    any character string - Name of Label to branch to
      value of " " indicates key is to be turned off
Tag     00000032 - Delivery Method Information (echo to response)
Length
Data
  Required Tags
    00000033 - Delivery Method Name
  Additional Tags
    00000034 - FAX Number (for "FAX" method)
    00000035 - Privacy Enhanced eMail Account (for "PEMail" method)
    00000036 - Profile's Associated Phone Number (for "BBS" method)
Tag     00000033 - Delivery Method Name
Length
Data
  any character string
    Legal Values
      "BBS"
      "FAX"
      "PEMail"
Tag     00000034 - FAX Number
Length
Data
  any character string (exactly one)
    Legal values
      10 Digit NADP
Tag     00000035 - Privacy Enhanced eMail Account
Length
Data
  Positional Tags
    any character string - internet eMail address
  Optional Tags
    any character string - Public PGP Key
      Legal values
        Not specified - indicates mail should not be encoded
        "ROT13"       - indicates ROT13 encoding should be used
        "PGP ###"     - indicates PGP public key "###" should be used
Tag     00000036 - Profile's Associated Phone Number
Length
Data
  any character string - Phone number associated with profile
    Legal values
      VNET Format
      NADP Format
      International Format
Tag     00000037 - Profile's Status
Length
Data
  any character string - Status (exactly one)
    Legal Values
      "Template"
      "Prototype"
      "Submit"
      "CanceledByAccountExecutive"
      "Submitted"
      "Reject"
      "Rejected"
      "CancelByAccountRepresentative"
      "CanceledByAccountRepresentative"
      "Accepted"          - Allowed into production system
      "QueuedForService"  - In production system, waiting
      "Active"            - In production system, profile used
      "Superceeded"       - In production system, past (remove it)
TAG     00000038 - Profile Version (#, D, T)
Length
Data
  Required Tags
    00000036            - Profile's Associated Phone Number
    any character string - Profile's desired active Date and Time
      Format of Date/Time string "YYYYMMDDHHSS" expressed
      in GMT
Tag     00000039 - Profile History
Length
Data
  00000040 - History Entry
Tag     00000040 - History Entry
Length
Data
  Positional Tags
    any character data - Date/Time of modification
      ("YYYYMMDDHHMM" GMT)
    any character data - Name of responsible party (Person or machine)
    any character data - Comments
Tag     000000100 - Order Entry Specification
Length
Data
  Required Tags
    00000020 - Company Name
    00000101 - Table of items to sell
    00000102 - Key selection data
    00000103 - Additional item data
    00000104 - Format of order information
```

TAG DEFINITIONS

```
      00000025 - Output Format - first is for start of OE (headers)
      00000025 - Output Format - last is for end of OE (trailers/totals)
   00000105 - Format of items ordered
      00000025 - Output Format - placed between first/last formats
                 of 00000104
Optional Tags
   Note: 00000111 should not be used with 00000110
   00000109 - Shipping & Handling Charge for base order
      any cost value
   00000110 - Shipping & Handling Charge for each specified address
      any cost value
   00000111 - Flat Rate Shipping & Handling SurCharge for multiple
      addresses
      any cost value
   00000121 - Shipping and handling adjustments by weight range
      (table)
      00000122 - S & H adjustment
         One of (minimum weight value)
         One of (price adjustment for order)
   00000130 - S & H charge based on Sub Total (keep in sorted order;
      lowest price
      00000131 - S & H for less than or equal to value
         One of (cost value)
         One of (price)
   00000132 - S & H charge based on percentage of Sub Total
      00000133 - S & H percentage for less than or equal to value
         One of (cost value)
         One of (percentage)
   00000133 - Minimum order value
      One of (cost value)
Predefined Field Names for Order Entry Results
   "@Items Ordered"      - number of items ordered (ULONG)
                   [ ]   - Array of values;
                           e.g. "Qty[2]" is 2nd item's Qty
   "@SKU/Description[ ]" - Array of SKU/Description
   "@Qty[ ]"             - Array of Quantity
   "@Price[c]"           - Array of Price (each)
   "@S & H Each[ ]"      - Array of Shipping and Handling (each)
   "@Cost[ ]"            - Array of Cost (Price * Quantity)
   "@S & H SubTTL[ ]"    - Array of S & H (Price * S & H each)
   "@Weight Each[ ]"     - Array of Weight (each)
   "@Weight SubTTL[ ]"   - Array of Weight (Price * Weight each)
   "@Descriptive Text[ ]" - Array of Descriptive Text
   "@Total Weight"       - Total Weight of order (sum of weights)
   "@Total Cost"         - Total Cost of items ordered (sum of costs)
   "@Total S & H"        - Total Shipping and Handling of items
                           ordered (sum of S)
   "@Tax"                - Total Tax
                           (from Total Cost and Total S & H)
   "@Total"              - Total Amount for Order
Tag      00000101 - Table of items to sell
Length
Data
   Required Tags
      00000105 - Item to sell
Tag      00000105 - Item to sell
Length
Data
   Required Tags
      00000106 - SKU/Description
         Required (1) of 00000001 or 00000002 (Character Strings)
      00000010 - Range (that the following (price, s&h) are good for
      00000107 - Price of each item
         any cost value
      00000108 - Shipping & Handling Charge for each item
         any cost value
   Optional Tags
      00000112 - Descriptive Text
         any character string with format data (e.g. ASCIIZ)
      00000113 - Weight (support is optional)
         any value
      00000115 - Tax Category Item belongs to
         any character string or numeric value
            (no values defined, depends on future Tax Server Requirements)
      00000117 - Appended SubKey Translation Entry
         any character string - key generated by Key selection data
         (must be unique)
         (multiple 00000117s allowed per 00000105; used for aliasing items
         that may be listed several times in the key selection data)
Tag      00000102 - Key selection data
Length
Data
   Required Tags
      00000114 - SubKey Menu
         Required Tags
            One Byte (unsigned) - depth of submenus below this level
                                  Note: if no submenus exist this value is 0
            One Byte (unsigned) - number of submenus to reserve at this
                                  level
                                  Note: this is the depth of
                                  more comboboxes below this e
            any character string - title of submenu or menu item
            One of -- specifies next submenu or return string
               00000114 - SubKey Menu
               any character string
Tag      00000103 - Additional item data
Length
Data
   Optional Tags
      00000118 - Group Box
      00000119 - Entry Field
      00000114 - SubKey Menu (Combo Box)
         Optional Tags (allowed in 00000103s only)
            00000015 - Field locator value
            00000120 - Price adjustment
               any price value
            00000121 - S & H adjustment
               any price value
            00000122 - MLE
Tag      000000118 - Group Box
Length
Data
   Required Tags
      00000012 - Field width
      00000013 - Field height
      00000020 - Prompt Text
      00000025 - Output Format - format for all data in Group Box
   Optional Tags
      00000023 - Info Area Text
Tag      00000119 - Entry Field
Length
Data
   Required Tags
      00000012 - Field width
      00000014 - Data Type
      00000020 - Prompt Text
      00000022 - Field Name
      00000025 - Output Format
   Optional Tags
      00000011 - Field requirement flag (default is not required)
      00000015 - Field locator value
      00000016 - Default data
      00000023 - Info Area Text
      00000024 - Edit Mask
Tag      00000122 - MLE (multi-line edit field)
Length
Data
   Required Tags
      00000012 - Field width
      00000013 - Field height
      00000014 - Data Type
      00000020 - Prompt Text
      00000022 - Field Name
      00000025 - Output Format (allow for contiguous or w/linefeeds)
   Optional Tags
      00000011 - Field requirement flag (default is not required)
      00000015 - Field locator value
      00000016 - Default data
      00000023 - Info Area Text
      00000024 - Edit Mask
Tag      000000200 - Panel
Length
Data
   Required Tags
      00000022 - Field Name (Unique ID for this panel)
```

| TAG DEFINITIONS |
|---|
| 00000025 - Output Format (for panel)<br>One of the following Panel Types<br>   00000201 - Script and Key Panel<br>   00000202 - Fields and Key Panel<br>   00000203 - Menu and Key Panel<br>   00000204 - Order Entry Panel<br>   00000205 - Call Completion Panel<br>   00000206 - Pop up Panel<br>   00000207 - Scrollable Text Panel<br>Optional Tags<br>Tag      00000201 - Script and Key Panel<br>Length<br>Data<br>  Required Tags<br>    00000026 - Script Text (only one)<br>    00000027 - Key Information (at least one)<br>  Optional Tags<br>Tag      000000202 - Fields and Key Panel<br>Length<br>Data<br>  Required Tags<br>    00000027 - Key Information (at least one)<br>    00000028 - Field Information<br>  Optional Tags<br>Tag      00000203 - Menu and Key Panel<br>Length<br>Data<br>  Required Tags<br>    00000026 - Script Text<br>    00000027 - Key Information (at least one)<br>    00000031 - Menu Items (at least two)<br>  Optional Tags<br>Tag      00000204 - Order Entry Panel<br>Length<br>Data<br>  Required Tags<br>    @@@ - collect caller info, ship info, credit card<br>    00000100 - Order Entry Specification<br>    @@@ - approve amount and charge credit card<br>  Optional Tags<br>Tag      00000205 - Call Completion Panel<br>Length<br>Data<br>  Required Tags<br>    @@@<br>  Optional Tags<br>Tag      00000206 - Pop up Panel<br>Length<br>Data<br>  Required Tags<br>    One of<br>      00000201<br>      00000202<br>  Optional Tags<br>Tag      00000207 - Scrollable Text Panel<br>Length<br>Data<br>  Required Tags<br>    any character string<br>  Optional Tags<br>Tag      00001000 - AnswerNet Profile<br>Length<br>Data<br>  Positional Tags<br>    00000037 - Profile Status<br>    00000038 - Profile Version (#, D, T)<br>  Required Tags<br>    00000030 - Opening script<br>    00000032 - Delivery Method<br>    00000200 - Panel (initial panel) (first one found)<br>    00000020 - Company Name<br>    00000047 - Company Address . . .<br>    00000048 - Company Contact Information . . .<br>    00000044 - GPF Data<br>    00000045 - Corporate ID<br>    00000046 - Accounting Office<br>  Optional Tags<br>    00000000 - Comments (identify creator) |

| TAG DEFINITIONS |
|---|
| 00000039 - Profile History<br>Tag      00002000 - AnswerNet Response<br>Length<br>Data<br>  Positional Tags<br>    00000032 - Delivery Method<br>  Required Tags<br>    any character string (at least one)<br>  Optional Tags<br>    00000000 - Comments (identify creator) |

It should be appreciated that the profile editor may also be used to edit a given customer profile after it is created. The profile menu 212 includes an open option for opening an existing profile. The values entered in the customer profile are shown in the respective fields of the respective property sheets. The profile editor may then be used to modify the value stored within these fields.

While the present invention has been described with reference to a preferred embodiment thereof, those skilled in the art will appreciate that various changes in form and detail may be made without departing from the intended scope of the present invention, as defined in the appended claims.

We claim:

1. In a computer system, a method for gathering data for a call center, comprising the computer-implemented steps of:

providing a profile editor for editing a customer profile for a customer of the call center;

using the profile editor to create the customer profile for the customer, said customer profile specifying a call flow for calls to the call center for the customer;

uploading the customer profile via electronic mail over a first network;

validating data in the customer profile; and downloading the customer profile via a second network to applications running on a plurality of agent consoles in the call center.

2. The method of claim 1 wherein the call center includes operators for servicing calls in the call center and wherein the customer profile specifies a script for use by one of the operators in servicing a call for the customer.

3. The method of claim 1 wherein the customer sells certain items and the customer profile specifies what items the customer sells.

4. The method of claim 3 wherein the customer profile contains pricing information regarding the items that the customer sells.

5. The method of claim 1, further comprising the step of forwarding the customer profile to at least one additional call center.

6. The method of claim 1, further comprising the step of using the profile editor to create an additional customer profile for an additional customer.

7. The method of claim 6, further comprising the step of forwarding the additional customer profile to the call center for use in the call center.

8. The method of claim 1 wherein the call center includes operators for servicing calls, wherein the operators each have computers that run an application that assists the operators in servicing calls and wherein the customer profile that is forwarded to the call center is used by the application on at least one of the computers to assist one of the operators in servicing a call for the customer.

9. The method of claim 1, further comprising the step of modifying the customer profile via the profile editor.

10. The method of claim 1, further comprising:

providing a test operator console program that simulates operation of one of the agent consoles; and running the test operator program to simulate call flows for calls to the customer based on the customer profile.

11. In a computer system, a computer-readable medium holding computer-executable instructions for performing a method for gathering data for a call center, comprising the computer-implemented steps of:

providing a profile editor for editing a customer profile for a customer of the call center;

using the profile editor to create the customer profile for the customer, said customer profile specifying a call flow for calls to the call center for the customer;

uploading the customer profile via electronic mail over a first network;

validating data in the customer profile; and downloading the customer profile via a second network to applications running on a Plurality of agent consoles in the call center.

12. The computer-readable medium of claims 11 wherein the call center includes operators for servicing calls in the call center and wherein the customer profile specifies a script for use by one of the operators in servicing a call for the customer.

13. The computer-readable medium of claim 11 wherein the call center includes operators for servicing calls in the call center and wherein the customer profile specifies a script for use by one of the operators in servicing a call for the customer.

14. The computer-readable medium of claim 13 wherein the customer profile contains pricing information regarding the items that the customer sells.

15. The computer-readable medium of claim 11 wherein the method further comprises the step of forwarding the customer profile to at least one additional call center.

16. The computer-readable medium of claim 11 wherein the method further comprises the step of forwarding the additional customer profile to the call center for use in the call center.

17. The computer-readable medium of claim 11 wherein the call center includes operators for servicing calls, wherein the operators each have computers that run an application that assists the operators in servicing calls and wherein the customer profile that is forwarded to the call center is used by the application on at least one of the computers to assist one of the operators in servicing a call for the customer.

18. The computer-readable medium of claim 11, further comprising:

providing a test operator console program that simulates operation of one of the agent consoles; and running the test operator program to simulate call flows for calls to the customer based on the customer profile.

* * * * *